US012631382B2

(12) United States Patent
Marcinkiewicz et al.

(10) Patent No.: US 12,631,382 B2
(45) Date of Patent: May 19, 2026

(54) MOTOR DRIVE CONTROL INCLUDING VARYING DC BUS VOLTAGES, CONVERTER AND INVERTER SWITCHING FREQUENCIES, AND MOTOR SPEED FOR THERMAL MITIGATION

(71) Applicant: Copeland LP, Sidney, OH (US)

(72) Inventors: Joseph G. Marcinkiewicz, St. Peters, MO (US); Mark Qin, Sidney, OH (US); Nikhil R. Lakhkar, Troy, OH (US); Robert Dziuba, Sidney, OH (US)

(73) Assignee: Copeland LP, Sidney, OH (US)

( * ) Notice: Subject to any disclaimer, the term of this patent is extended or adjusted under 35 U.S.C. 154(b) by 819 days.

(21) Appl. No.: 17/453,802

(22) Filed: Nov. 5, 2021

(65) Prior Publication Data

US 2023/0146546 A1 May 11, 2023

(51) Int. Cl.
| | |
|---|---|
| *F25B 13/00* | (2006.01) |
| *F25B 31/02* | (2006.01) |
| *F25B 49/02* | (2006.01) |
| *H02P 29/68* | (2016.01) |

(52) U.S. Cl.
CPC ............ *F25B 49/025* (2013.01); *F25B 13/00* (2013.01); *F25B 31/02* (2013.01); *H02P 29/68* (2016.02); *H02P 2201/09* (2013.01); *H02P 2201/15* (2013.01)

(58) Field of Classification Search
CPC ........ F25B 49/025; F25B 13/00; F25B 31/02; H02P 29/68; H02P 2201/09
See application file for complete search history.

(56) References Cited

U.S. PATENT DOCUMENTS

| | | | |
|---|---|---|---|
| 8,238,131 | B2 | 8/2012 | Hedemaki et al. |
| 9,712,071 | B2 | 7/2017 | Yuasa et al. |
| 10,989,195 | B2 | 4/2021 | Kawashima et al. |
| 2001/0009360 | A1 | 7/2001 | Jin |

(Continued)

FOREIGN PATENT DOCUMENTS

| | | |
|---|---|---|
| CN | 107070364 B | 8/2019 |
| JP | 4124205 B2 | 7/2008 |

(Continued)

OTHER PUBLICATIONS

International Search Report and Written Opinion of the ISA issued in PCT/US2022/048566, mailed Mar. 9, 2023; ISA/KR.

(Continued)

*Primary Examiner* — Nael N Babaa
(74) *Attorney, Agent, or Firm* — Harness, Dickey & Pierce, P.L.C.

(57) ABSTRACT

In other features, a refrigeration system is provided and includes a compressor motor, an inverter, a converter and a control module. The inverter is configured to convert a direct current (DC) bus voltage to an alternating current (AC) voltage and supply the AC voltage to the compressor motor. The converter is configured to convert a DC input voltage to the DC bus voltage. The control module is configured to obtain a parameter and in response to the parameter exceeding a predetermined threshold, reduce the DC bus voltage and at least one of (i) reduce a switching frequency, (ii) increase an amount of negative d-axis current of the compressor motor, or (iii) reduce a speed of the compressor motor.

27 Claims, 23 Drawing Sheets

(56) References Cited

U.S. PATENT DOCUMENTS

| | | | |
|---|---|---|---|
| 2007/0147100 A1 | 6/2007 | Tashima et al. | |
| 2009/0095002 A1 | 4/2009 | McSweeney et al. | |
| 2015/0002058 A1 | 1/2015 | Kashihara et al. | |
| 2015/0377537 A1* | 12/2015 | West | F25B 49/022 |
| | | | 62/115 |
| 2016/0245571 A1 | 8/2016 | Shinomoto et al. | |
| 2016/0380575 A1* | 12/2016 | Tsumura | H02P 6/14 |
| | | | 318/478 |

FOREIGN PATENT DOCUMENTS

| | | | |
|---|---|---|---|
| JP | 2010081746 A | 4/2010 | |
| WO | 2017181076 A1 | 10/2017 | |

OTHER PUBLICATIONS

Extended Search Report regarding European Patent Application No. 228906806 dated Aug. 18, 2025.

* cited by examiner

MOTOR DRIVE CONTROL INCLUDING VARYING DC BUS VOLTAGES, CONVERTER AND INVERTER SWITCHING FREQUENCIES, AND MOTOR SPEED FOR THERMAL MITIGATION

FIELD

The present disclosure relates to vehicles and, more particularly, to thermal control of drives of refrigeration systems of vehicles.

BACKGROUND

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In other features, a refrigeration system is provided and includes a compressor motor, an inverter, a converter and a control module. The inverter is configured to convert a direct current (DC) bus voltage to an alternating current (AC) voltage and supply the AC voltage to the compressor motor. The converter is configured to convert a DC input voltage to the DC bus voltage. The control module is configured to obtain a parameter and in response to the parameter exceeding a predetermined threshold, reduce the DC bus voltage and at least one of (i) reduce a switching frequency, (ii) increase an amount of negative d-axis current of the compressor motor, or (iii) reduce a speed of the compressor motor.

In other features, the parameter is a temperature or a current level of current supplied to the compressor motor.

In other features, the control module is configured to obtain the parameter and one or more other parameters and in response to the parameter and the one or more other parameters, reduce the DC bus voltage and at least one of (i) reduce the switching frequency, (ii) increase the amount of negative d-axis current of the compressor motor, or (iii) reduce the speed of the compressor motor. The parameter is a temperature. The one or more other parameters include a current level of current supplied to the compressor motor.

In other features, the switching frequency is a switching frequency of the converter. The control module is configured to, in response to the parameter exceeding the predetermined threshold, reduce the switching frequency of the converter.

In other features, the control module is configured to, in response to the parameter exceeding the predetermined threshold and in addition to reducing the switching frequency of the converter, also reduce the switching frequency of the inverter.

In other features, the switching frequency is a switching frequency of the inverter. The control module is configured to, in response to the parameter exceeding the predetermined threshold, reduce the switching frequency of the inverter.

In other features, the control module is configured to: obtain at least one of a temperature of the converter, a temperature of the inverter, a temperature of the control module, or an ambient temperature; and based on the at least one of a temperature of the converter, the temperature of the inverter, the temperature of the control module, or the ambient temperature, reduce the DC bus voltage and at least one of (i) reduce a switching frequency of the inverter, or (ii) reduce a switching frequency of the converter.

In other features, the control module is configured to: obtain a temperature of the converter; and in response to a temperature of the converter being greater than a predetermined temperature, reduce the DC bus voltage and at least one of (i) reduce a switching frequency of the inverter, or (ii) reduce a switching frequency of the converter.

In other features, the control module is configured to, subsequent to reducing the DC bus voltage and the at least one of (i) reducing a switching frequency of the inverter, or (ii) reducing a switching frequency of the converter, and in response to the temperature of the converter not increasing and/or not increasing at a predetermined rate, reduce the speed of the compressor motor.

In other features, the parameter is a temperature of the converter. The control module is configured to, in response to the temperature of the converter being greater than a predetermined temperature, increase the amount of negative d-axis current of the compressor motor.

In other features, the control module is configured to decrease the speed of the compressor motor to reduce the temperature of the converter, only subsequent to determining that reduction in switching frequency of the converter and reduction in the DC bus voltage is not at least one of (i) reducing the temperature of the converter, or (ii) reducing the temperature of the converter at least at a predetermined rate.

In other features, the control module is configured to reduce the speed of the compressor motor in response to the parameter exceeding the predetermined threshold.

In other features, the control module is configured to: obtain a temperature of the converter, a temperature of the inverter, a temperature of the control module, and an ambient temperature; and based on the temperature of the converter, the temperature of the inverter, the temperature of the control module, and the ambient temperature reduce the DC bus voltage and at least one of (i) reduce a switching frequency of the inverter, or (ii) reduce a switching frequency of the converter.

In other features, the control module is configured to: determine a minimum one of the temperature of the converter, the temperature of the inverter, the temperature of the control module, and the ambient temperature; and reduce the switching frequency based on the minimum one of the temperature of the converter, the temperature of the inverter, the temperature of the control module, and the ambient temperature.

In other features, the control module is configured to: determine a minimum one of the temperature of the converter, the temperature of the inverter, the temperature of the control module, and the ambient temperature; and reduce the speed of the compressor motor based on the minimum one of the temperature of the converter, the temperature of the inverter, the temperature of the control module, and the ambient temperature.

In other features, the control module is configured to: determine a minimum one of the temperature of the converter, the temperature of the inverter, the temperature of the control module, and the ambient temperature; and reduce the DC bus voltage based on the minimum one of the temperature of the converter, the temperature of the inverter, the temperature of the control module, and the ambient temperature.

In other features, the refrigeration system further includes a sensor configured to detect the parameter.

In other features, the parameter is a temperature of the converter. The switching frequency is a switching frequency of a switch of the converter. The converter is a DC-to-DC boost converter. The control module is configured to: obtain the temperature of the converter and an ambient temperature; and in response to (i) the temperature of the converter exceeding the predetermined threshold, and (ii) the ambient temperature being within a first predetermined temperature range, reduce the switching frequency from a first switching frequency to a second switching frequency and reduce the DC bus voltage from a first DC bus voltage to a second DC bus voltage.

In other features, the control module is configured to, in response to the temperature of the converter being greater than the predetermined threshold and the ambient temperature being within a second predetermined temperature range that is different than the first predetermined temperature range, further reduce the switching frequency from the second switching frequency to a third switching frequency and further reduce the DC bus voltage from the second DC bus voltage to a third DC bus voltage.

In other features, the control module is configured to control the inverter in at least one of an overmodulation state or a clamping state to reduce the parameter.

In other features, the control module is configured to control the inverter in an overmodulation state and a clamping state to reduce the parameter.

In other features, a method of operating a refrigeration system, is provided and includes: converting a DC input voltage to a DC bus voltage; converting via a converter the DC bus voltage to an AC voltage and supplying the AC voltage to drive a compressor motor; detecting a parameter; and in response to the parameter exceeding a predetermined threshold, reducing the DC bus voltage and at least one of (i) reducing a switching frequency, (ii) increasing an amount of negative d-axis current of the compressor motor, or (iii) reducing a speed of the compressor motor.

In other features, the parameter is a temperature of the converter. The switching frequency is a switching frequency of a switch of the converter. The converter is a DC-to-DC boost converter.

In other features, the method further includes: obtaining the temperature of the converter and an ambient temperature; and in response to (i) the temperature of the converter exceeding the predetermined threshold, and (ii) the ambient temperature being within a first predetermined temperature range, reducing the switching frequency from a first switching frequency to a second switching frequency and reducing the DC bus voltage from a first DC bus voltage to a second DC bus voltage.

In other features, the method further includes, in response to the temperature of the converter being greater than the predetermined threshold and the ambient temperature being within a second predetermined temperature range that is different than the first predetermined temperature range, further reducing the switching frequency from the second switching frequency to a third switching frequency and further reducing the DC bus voltage from the second DC bus voltage to a third DC bus voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A refrigeration system for a vehicle may include a variable speed compressor. The variable speed compressor provides variable refrigerant flow throughout the refrigerant system to modulate capacity and meet different demand loads. For example, an electronic drive may generate a drive signal (such as a pulse width modulation signal) to adjust the speed of the compressor. The drive receives an indication of a capacity demand of the refrigeration system and generates the drive signal according to the capacity demand (e.g., to adjust a speed of a drive shaft of the compressor).

During operation of a drive of a compressor, various temperatures may increase including ambient temperatures, direct current (DC)-to-DC (DC/DC) converter temperatures, inverter temperatures, processor temperatures, etc. The examples set forth herein include implementation of thermal mitigation methods to reduce operating temperatures and extend temperature ranges within which drives may be utilized. The thermal mitigation strategies include changing drive switching frequencies, DC bus voltages, and motor speeds. Thermal mitigation is performed to prevent a temperature of a DC/Dc boost converter of a drive from exceeding a predetermined threshold and prevent a drive from being shutdown. The examples can increase operating range of variable compressor speed system in a high temperature environment by as much as 10%. The examples are applicable to at least 48V transport drives (or compressor drives of vehicles). The examples are applicable to both drives with boost front end DC inputs and boost front end AC inputs.

Figure 1A:
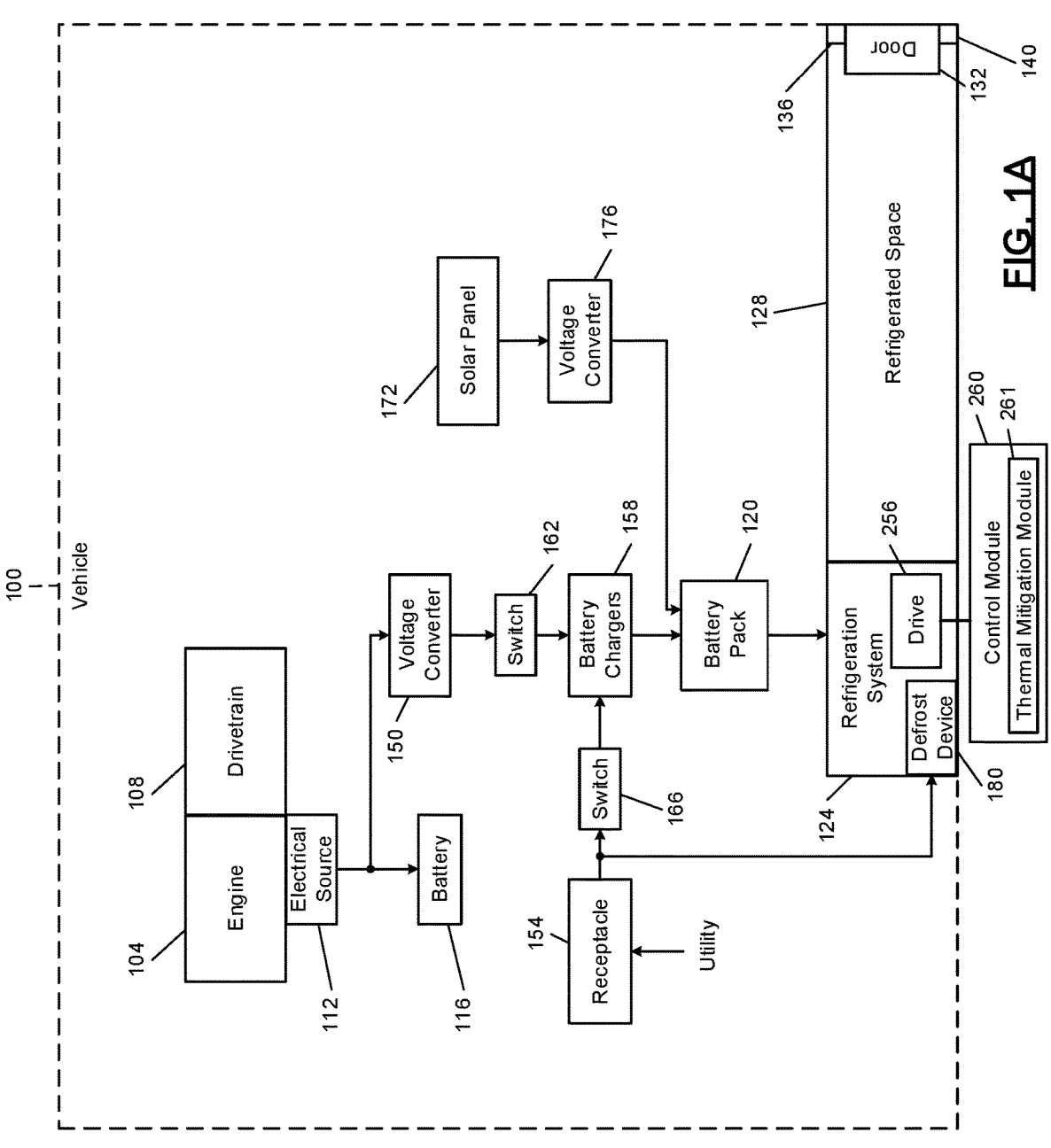
FIGS. 1A and 1B are functional block diagrams of example vehicle systems including a control module and a thermal mitigation module in accordance with the present disclosure.
Figure 1B:
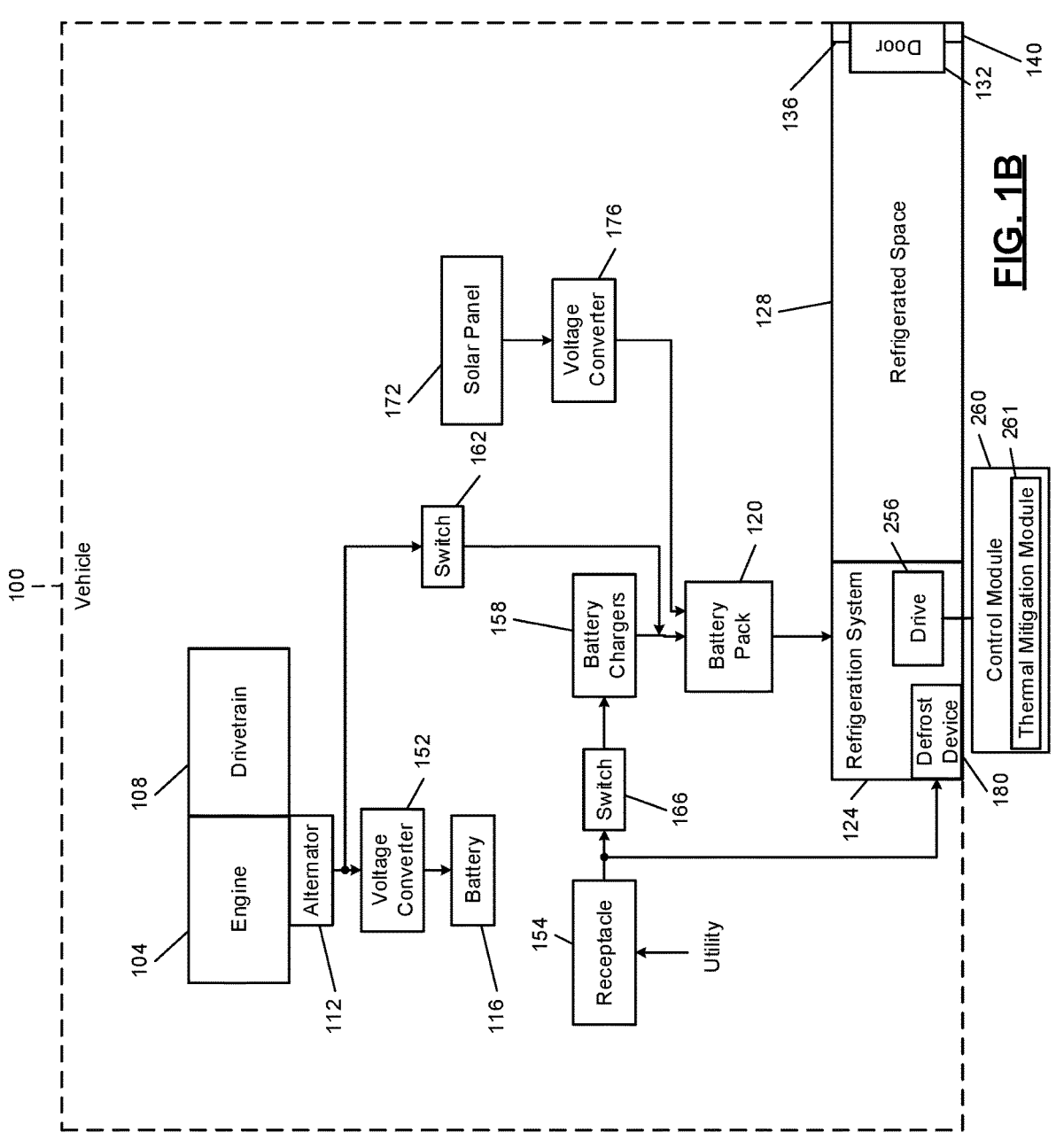

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a wheeled vehicle is provided, the present application is not limited to vehicles having wheels and is also applicable to water and/or air based vehicles.

An alternator 112 is driven by the engine 104 and converts mechanical energy of the engine 104 into electrical energy to charge a battery 116. While the example of the alternator 112 is provided, a generator may be used in place of the alternator 112. The alternator 112 may be, for example, a 12 V alternator (e.g., in the example of FIG. 1A) or a 48 V alternator (e.g., in the example of FIG. 1B). As used herein, including the claims, the term "alternator" can refer to an alternator, a generator, or another device that converts mechanical energy from the engine 104 into electrical energy.

The vehicle 100 also includes a battery pack 120. For example only, the battery pack 120 may be a 48 Volt (V) direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

The refrigeration system 124 may include a drive 256 for driving a compressor. A control module 260 may control operation of the drive 256 and may include a thermal mitigation module 261. The thermal mitigation module 261 may perform thermal mitigation operations to prevent temperatures of the drive 256 and corresponding electronic components from exceeding predetermined thresholds.

Figure 2A:
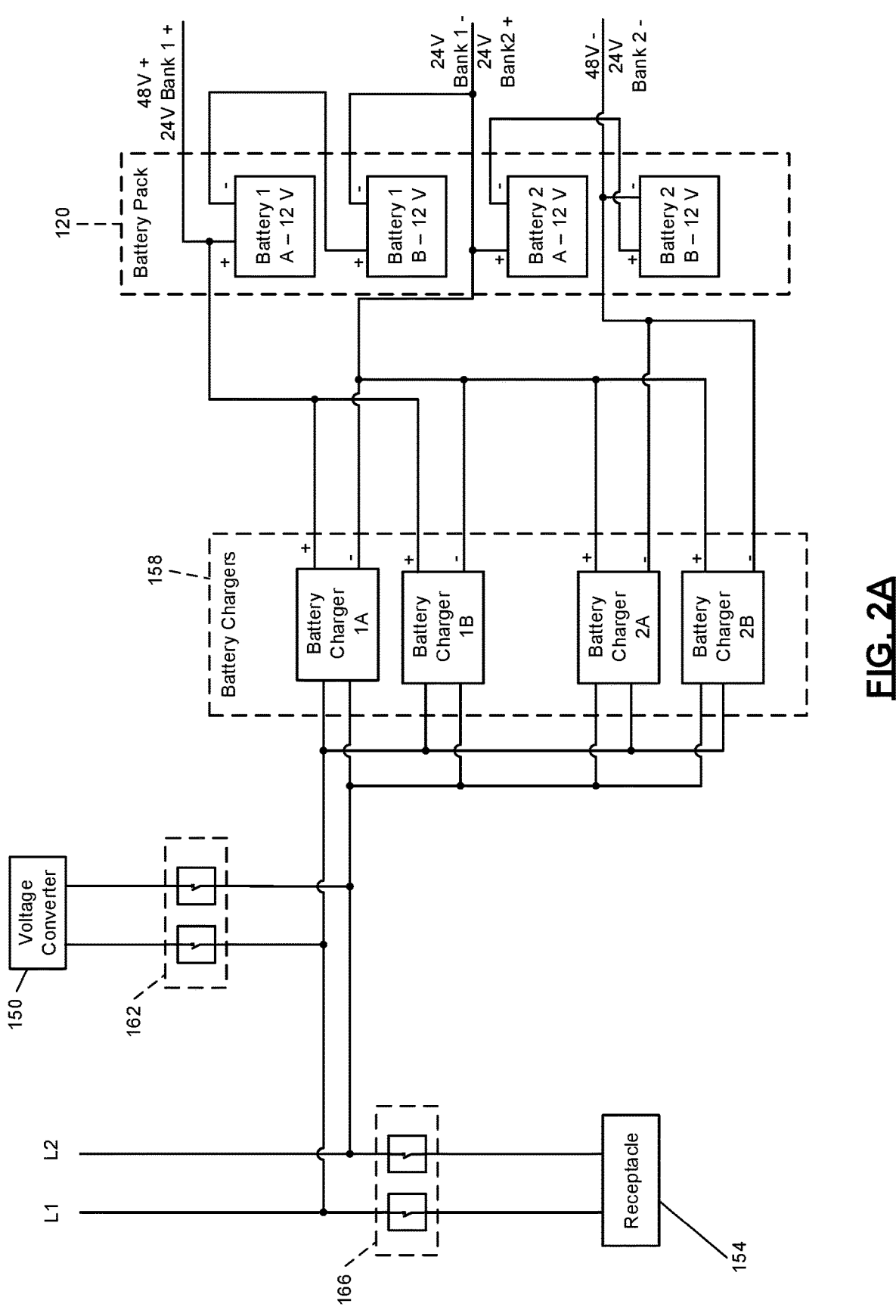
FIGS. 2A and 2B are schematics including a battery pack for a refrigeration system of a vehicle and example charging systems for charging the battery pack.
Figure 2B:
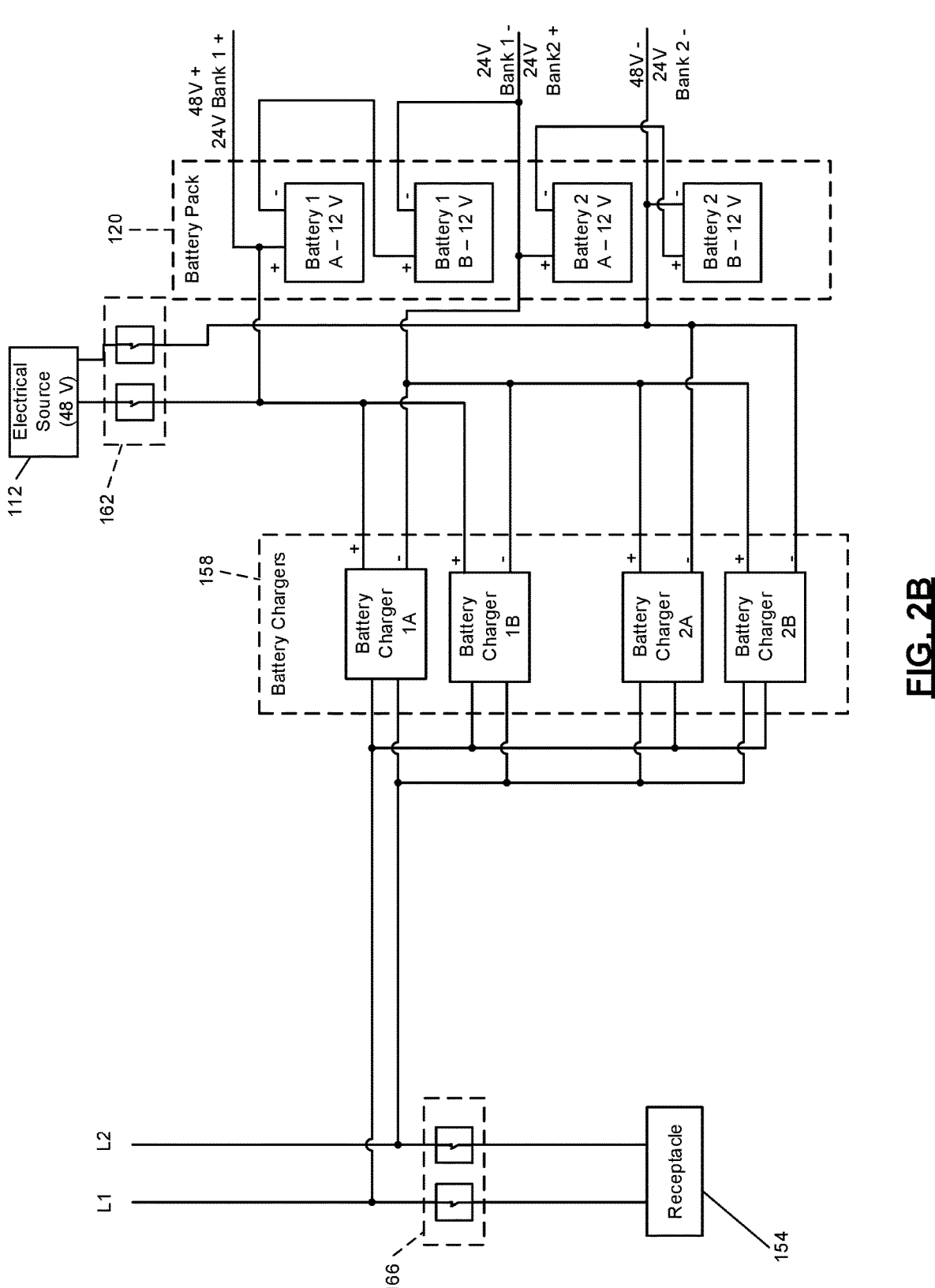

FIGS. 2A and 2B are schematics including examples of the battery pack 120 for a refrigeration system of a vehicle and example charging systems. In the examples of FIGS. 2A and 2B, the battery pack 120 includes four individual 12 V batteries connected in series. The batteries are arranged in two banks (A and B), each bank having two individual 12 V batteries (batteries 1 and 2) connected in series, to provide two 24 V reference potentials.

Referring back to FIGS. 1A and 1B, the battery pack 120 supplies power to a refrigeration system 124. The refrigeration system 124 cools a refrigerated space 128. The refrigerated space 128 may be one refrigerated space that is cooled based on a setpoint temperature. Alternatively, the refrigerated space 128 may be divided (e.g., physically) into multiple refrigerated spaces that may be cooled based on respective setpoint temperatures. For example, a first portion of the refrigerated space 128 may be cooled based on a first setpoint temperature (e.g., for refrigerated items) and a second portion of the refrigerated space 128 may be cooled based on a second setpoint temperature (e.g., for frozen items) that is less than the first setpoint temperature. One example of such a vehicle includes a truck for transporting perishable food items between locations. The refrigerated space(s) may be cooled with a closed loop control system based on temperature(s) within the refrigerated space(s) and the set point temperature(s), respectively.

The vehicle 100 includes a door 132 that provides access to the refrigerated space 128, for example, for loading and unloading of contents of the refrigerated space 128. While the example of one door is provided, the vehicle 100 may include two or more doors. Some vehicles include fourteen (14) or more doors.

An unlock actuator 136 and a lock actuator 140 may unlock and lock the door 132, respectively. The unlock and lock actuators 136 and 140 may, for example, slide a pin out of and into a receiver to lock and unlock the door 132, respectively. An unlock actuator and a lock actuator may be provided with each door to the refrigerated space in various implementations.

A control module (discussed further below) of the refrigeration system 124 may actuate the unlock actuator 136 to unlock the door 132 (and the other doors to the refrigerated space 128) in response to user input to unlock doors of a passenger cabin of the vehicle 100. The control module may actuate the lock actuator 140 to lock the door 132 (and the other doors to the refrigerated space 128) in response to user input to lock the doors of the passenger cabin of the vehicle 100. User input to lock and unlock the doors of the passenger cabin may be provided, for example, via a wireless key fob, a mobile device (e.g., cell phone, tablet, or other handheld device), a remote computer system, and/or one or more lock/unlock switches accessible from within the passenger cabin of the vehicle 100.

The battery pack 120 can be charged using multiple different power sources. For example, in the example of FIG. 1A, the vehicle 100 includes a voltage converter 150 that converts power output by the alternator 112 (e.g., 12 V) into power for charging the battery pack 120. The voltage converter 150 may convert the DC output of the alternator 112 into, for example, 240 V alternating current (AC). Since the alternator 112 is driven by rotation of the engine 104, the alternator 112 may be used to charge the battery pack 120 when the engine 104 is running.

While the alternator 112 is shown as providing power for charging both the battery 116 and the battery pack 120, a second alternator may be used to convert power of the engine 104 into electrical power for the battery pack 120. In that case, the alternator 112 may be used to charge the battery 116. In various implementations, the voltage converter 150 and a switch 162 may be omitted, and the engine 104 may not be used to charge the battery pack 120. The battery pack 120 may instead be charged via one or more other power sources, such as those discussed further below.

As another example, in the example of FIG. 1B, the alternator 112 may charge the battery pack 120. In this example, a voltage converter 152 may convert the power output by the alternator 112 (e.g., 48 V) into power for charging the battery 116. The voltage converter 152 may convert the DC output of the alternator 112 into, for example, 12 V for the battery 116. Alternatively, however, another alternator may be used to charge the battery 116.

The battery pack 120 can be charged using power from a utility received via a receptacle 154. The receptacle 154 is configured to receive AC or DC power. For example, the receptacle 154 may receive AC power from a utility via a power cord (e.g., an extension cord) connected between the receptacle 154 and a wall outlet or charger of a building. The receptacle 154 may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle 154 receiving AC power is provided, the receptacle 154 may alternatively receive DC power from via a power cord. In various implementations, the vehicle 100 may include one or more AC receptacles and/or one or more DC receptacles. Power received from a utility via the receptacle 154 will be referred to as shore power.

The vehicle 100 also includes one or more battery chargers 158. The battery chargers 158 charge the batteries of the battery pack 120 using shore power received via the receptacle 154 (or power output by the voltage converter 150 in the examples of FIGS. 1A and 2A). When the receptacle 154 is connected to shore power, the switch 162 opens (or is opened) to isolate power from the alternator 112. While the switch 162 is shown illustratively as one switch, the switch 162 may include one, two, or more than two switching devices (e.g., normally closed or normally open relays). In the examples of FIGS. 2A and 2B, the switch 162 is illustrated as including two relays, one relay for each power line.

When the receptacle 154 is connected to shore power and the ignition system of the vehicle 100 is OFF, a switch 166 closes (or is closed) to relay power from the receptacle 154 to the battery chargers 158, and the battery chargers 158 charge the batteries using shore power. While the switch 166 is also shown illustratively as one switch, the switch 166 may include one, two, or more than two switching devices (e.g., normally closed or normally open relays). In the example of FIGS. 2A and 2B, the switch 166 is illustrated as including two relays, one relay for each power line.

When the ignition system of the vehicle 100 is ON, the switch 166 isolates the receptacle 154 from the battery chargers 158. In the examples of FIGS. 1A and 2A, when the ignition system of the vehicle 100 is ON (such that the engine 104 is running and the voltage converter 150 is outputting power to charge the battery pack 120), the switch 162 connects the voltage converter 150 to the battery chargers 158. The battery chargers 158 can then charge the batteries of the battery pack 120 using power output by the voltage converter 150. In the examples of FIGS. 1B and 2B, when the ignition system of the vehicle 100 is ON (such that the engine 104 is running and the alternator 112 is outputting power), the switch 162 connects the alternator 112 to the battery pack 120 so the alternator 112 charges the battery pack 120.

One battery charger may be provided for each battery of the battery pack 120. Two or more battery chargers may be connected in series and/or parallel in various implementations. Each battery charger may convert input power (e.g., shore power or power output by the voltage converter 150) into, for example, 24 V, 40 amp (A) DC power for charging. For example only, the battery chargers 158 may include one model SEC-2440 charger, manufactured by Samlex America Inc., of Burnaby, BC, Canada. In the examples of FIGS. 2A and 2B, two groups of two 24 V, 40 A battery chargers are connected to provide a 48 V, 80 A output for battery charging. While the example of battery chargers having a 24 V, 40 A output is provided, battery chargers having another output may be used, such as one 12 V charger connected to each battery. The battery chargers 158 may also monitor the individual batteries and control application of power to the respective batteries to prevent overcharging.

The vehicle 100 may optionally include a solar panel 172. The solar panel 172 converts solar energy into electrical energy. While the example of one solar panel is provided, multiple solar panels may be used. A voltage converter 176 converts power output by the solar panel 172 and charges the battery pack 120.

As discussed further below, the refrigeration system 124 includes one or more eutectic plates. The eutectic plate(s) are cooled when the vehicle 100 is connected to shore power. When the vehicle 100 is later disconnected from shore power (e.g., for delivery of contents of the refrigerated space 128), the eutectic plate(s) can be used to cool the refrigerated space 128 via power from the battery pack 120. The eutectic plate(s) can also be cooled by the refrigeration system 124 when the vehicle 100 is disconnected from shore power.

By charging the battery pack 120 when the vehicle 100 is connected to shore power (and/or via the solar panel 172), use of the engine 104 to generate power to operate the refrigeration system 124 when the vehicle 100 is disconnected from shore power may be minimized or eliminated. This may decrease fuel consumption (and increase fuel efficiency) of the engine 104 and the vehicle 100.

A defrost device 180 may be used to defrost the eutectic plate(s) when the vehicle 100 is connected to shore power. One example of the defrost device 180 includes a resistive heater that warms air circulated over, around, and/or through the eutectic plate(s), such as by one or more fans. Another example of the defrost device 180 includes a resistive heater that warms a fluid (e.g., a glycol solution) that is circulated over, around, and/or through the eutectic plate(s), such as by one or more pumps. In this way, heat from the warm air or warm fluid defrosts the eutectic plate(s).

Figure 3:
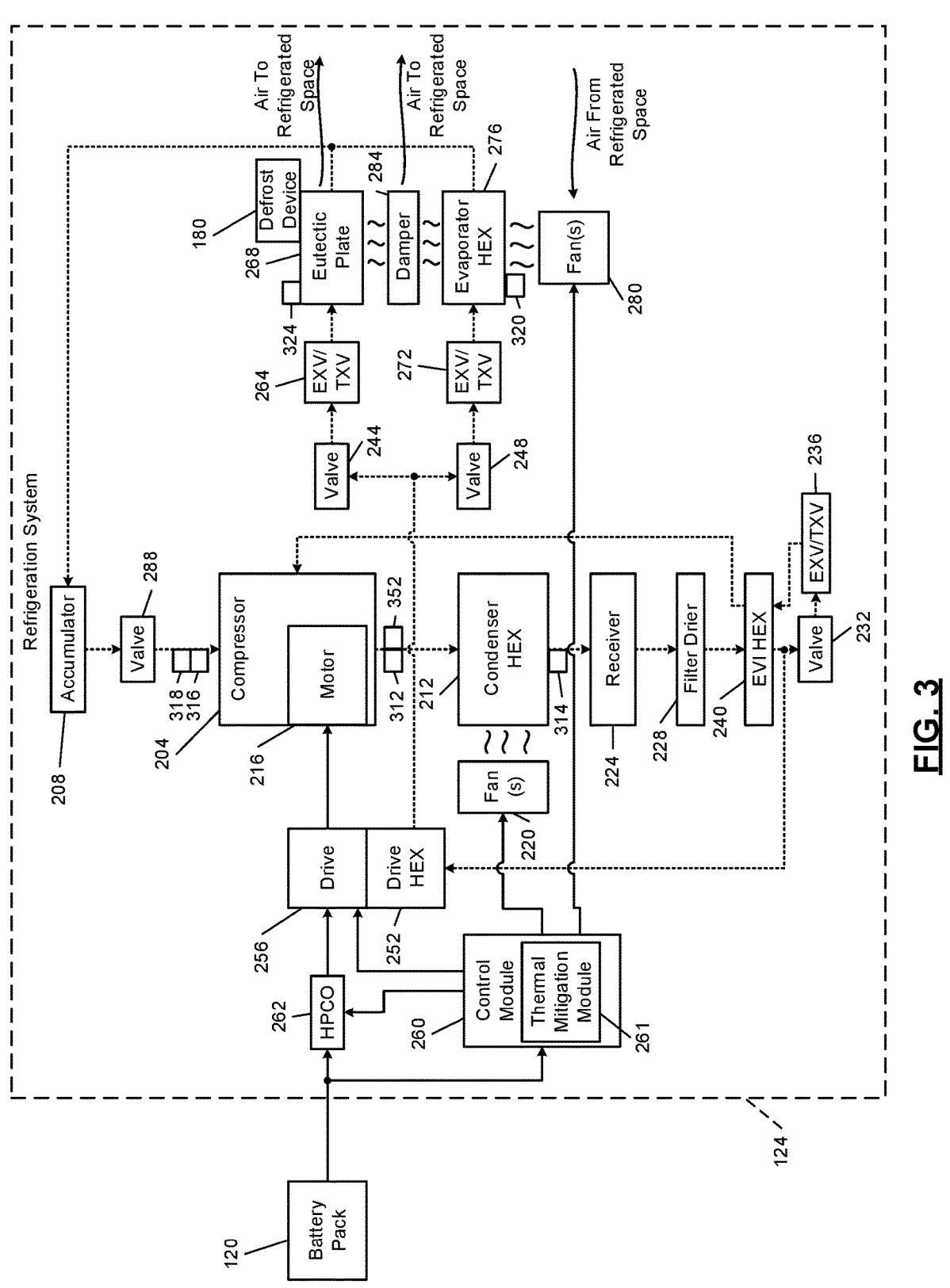
FIG. 3 is a functional block diagram of an example implementation of a refrigeration system of a vehicle including the control and thermal mitigation modules.

FIG. 3 includes a functional block diagram of an example implementation of the refrigeration system 124. In the example of FIG. 3, dotted lines indicate refrigerant flow, while solid lines indicate electrical connections. In various implementations, some, all, or none of the components of the refrigeration system 124 may be located within the refrigerated space 128.

A compressor 204 receives refrigerant vapor from an accumulator 208 via a suction line of the compressor 204. The accumulator 208 collects liquid refrigerant to minimize liquid refrigerant flow to the compressor 204. The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor, for example, due to BPM motors being more efficient than other types of electric motors.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form. One or more condenser fans 220 may be implemented to increase airflow over, around, and/or through the condenser HEX 212 and increase the rate of heat transfer away from the refrigerant.

Refrigerant from the condenser HEX 212 is delivered to a receiver 224. The receiver 224 may be implemented to store excess refrigerant. In various implementations, the receiver 224 may be omitted. A filter drier 228 may be implemented to remove moister and debris from the refrigerant. In various implementations, the filter drier 228 may be omitted.

When an enhanced vapor injection (EVI) valve 232 is open, a portion of the refrigerant may be expanded to vapor form by an expansion valve 236 and provided to an EVI HEX 240. The EVI valve 232 may be, for example, a solenoid valve or another suitable type of valve.

The EVI HEX 240 may be a counter flow plate HEX and may superheat the vapor refrigerant from the EVI valve 232. Vapor refrigerant from the EVI HEX 240 may be provided to the compressor 204, such as at a midpoint within a compression chamber of the compressor 204. EVI may be performed, for example, to increase capacity and increase efficiency of the refrigeration system 124. The EVI valve 232 may include a thermostatic expansion valve (TXV) or an electronic expansion valve (EXV).

The refrigerant not flowing through the EVI valve 232 is circulated to a plate control valve 244 and an evaporator control valve 248. The plate control valve 244 may be, for example, a solenoid valve or another suitable type of valve. The evaporator control valve 248 may be, for example, a solenoid valve or another suitable type of valve.

Before flowing to the plate control valve 244 and the evaporator control valve 248, the refrigerant may flow through a drive HEX 252. The drive HEX 252 draws heat away from a drive 256 and transfers heat to refrigerant flowing through the drive HEX 252. While the example of the drive HEX 252 being liquid (refrigerant) cooled is provided, the drive 256 may additionally or alternatively be air cooled. Air cooling may be active (e.g., by a fan) or passive (e.g., by conduction and convection).

The drive 256 controls application of power to the motor 216 from the battery pack 120. For example, the drive 256 may control application of power to the motor 216 based on a speed command from the control module 260. Based on the speed command, the drive 256 may generate three-phase AC power (e.g., 208/240 V AC) and apply the three-phase AC power to the motor 216. The drive 256 may set one or more characteristics of the three-phase AC power based on the speed command, such as frequency, voltage, and/or current. For example only, the drive 256 may be a variable frequency drive (VFD). In various implementations, one or more electromagnetic interference (EMI) filters may be implemented between the battery pack 120 and the drive 256.

The control module 260 may set the speed command to a plurality of different possible speeds for variable speed operation of the motor 216 and the compressor 204. The control module 260 and the drive 256 may communicate, for example, using RS485 Modbus or another suitable type of communication including, but not limited to, controller area network (CAN) Bus or analog or analog signaling (e.g., 0-10V signals). The control module 260 includes the thermal mitigation module 261 and may control operation of the drive and the motor 216 to reduce operating temperatures under certain conditions.

A high pressure cut off (HPCO) 262 may be implemented to disconnect the drive 256 from power and disable the motor 216 when the pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor is less than a second predetermined pressure that is less than or equal to the predetermined pressure used by the HPCO 262.

When the plate control valve 244 is open, refrigerant may be expanded to vapor form by an expansion valve 264 and provided to eutectic plate(s) 268. The vapor refrigerant cools the eutectic plate(s) 268 and a solution within the eutectic plate(s) 268. For example only, the solution may be a solution including one or more salts. The solution may have a freezing point temperature of, for example, approximately 12 degrees Fahrenheit or another suitable freezing point temperature. The solution of the eutectic plate 268 may be selected, for example, based on the items typically cooled within the refrigerated space 128. The expansion valve 264 may include a TXV or may be an EXV.

The eutectic plate(s) 268 are located within the refrigerated space 128 and cools the refrigerated space 128. By freezing the solution within the eutectic plate(s) 268, the eutectic plate(s) 268 can be used to cool the refrigerated space for a period of time after the freezing, such as while the vehicle 100 is transporting items within the refrigerated space 128.

When the evaporator control valve 248 is open, refrigerant may be expanded to vapor form by an expansion valve 272 and provided to an evaporator HEX 276. The expansion valve 272 may include a TXV or may be an EXV. Like the eutectic plate(s) 268, the evaporator HEX 276 cools the refrigerated space 128. More specifically, the vapor refrigerant within the evaporator HEX 276 transfers heat away (i.e., absorbs heat) from air within the refrigerated space 128.

One or more evaporator fans 280 may draw air from the refrigerated space 128. The evaporator fan(s) 280 may increase airflow over, around, and/or through the evaporator HEX 276 and the eutectic plate(s) 268 to increase the rate of heat transfer away from (i.e., cooling of) the air within the refrigerated space 128. A damper door 284 may be implemented to allow or block airflow from the evaporator fan(s) 280 to the eutectic plate(s) 268. For example, when the damper door 284 is open, the evaporator fan(s) 280 may circulate air past the evaporator HEX 276 and the eutectic plate(s) 268. When the damper door 284 is closed, the damper door 284 may block airflow from the evaporator fan(s) 280 to the eutectic plate(s) 268, and the evaporator fan(s) 280 may circulate air over, around, and/or through the evaporator HEX 276. While the example of the damper door 284 is provided, another suitable actuator may be used to allow/prevent airflow from the evaporator fan(s) 280 to the eutectic plate(s) 268. Alternatively, one or more fans may be provided with the evaporator HEX 276, and one or more fans may be provided with the eutectic plate(s) 268. Refrigerant flowing out of the eutectic plate(s) 268 and the evaporator HEX 276 may flow back to the accumulator 208. Air cooled by the evaporator HEX 276 and the eutectic plate(s) 268 flows to the refrigerated space to cool the refrigerated space 128. While separate cooled air paths are illustrated in the example of FIG. 3, air flowing out of the eutectic plate(s) 268 may be combined with air flowing out of the evaporator HEX 276 before the cooled air is output to cool the refrigerated space 128. Curved lines in FIG. 3 are illustrative of air flow.

The refrigeration system 124 may also include a compressor pressure regulator (CPR) valve 288 that regulates pressure of refrigerant input to the compressor 204 via the suction line. For example, the CPR valve 288 may be closed to limit pressure into the compressor 204 during startup of the compressor 204. The CPR valve 288 may be an electronically controlled valve (e.g., a stepper motor or solenoid valve), a mechanical valve, or another suitable type of valve. In various implementations, the CPR valve 288 may be omitted.

Figure 4A:
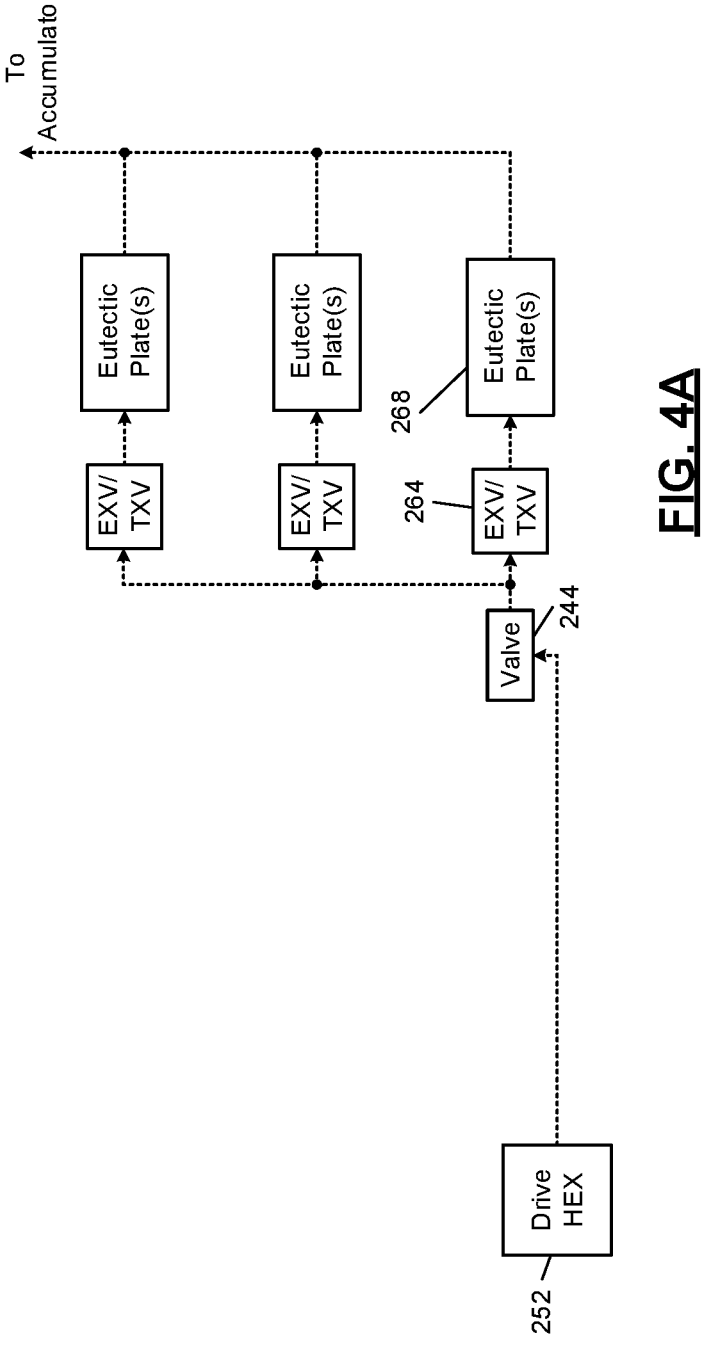
FIG. 4A includes a functional block diagram of a portion of an example refrigeration system including multiple eutectic plates.

The example of one eutectic plate and one evaporator HEX is provided in FIG. 3. However, the refrigeration system 124 may include more than one eutectic plate, such as two, three, four, five, six, or more eutectic plates. One expansion valve may be provided for each eutectic plate. FIG. 4A includes a functional block diagram of a portion of an example refrigeration system including multiple eutectic plates.

Figure 4B:
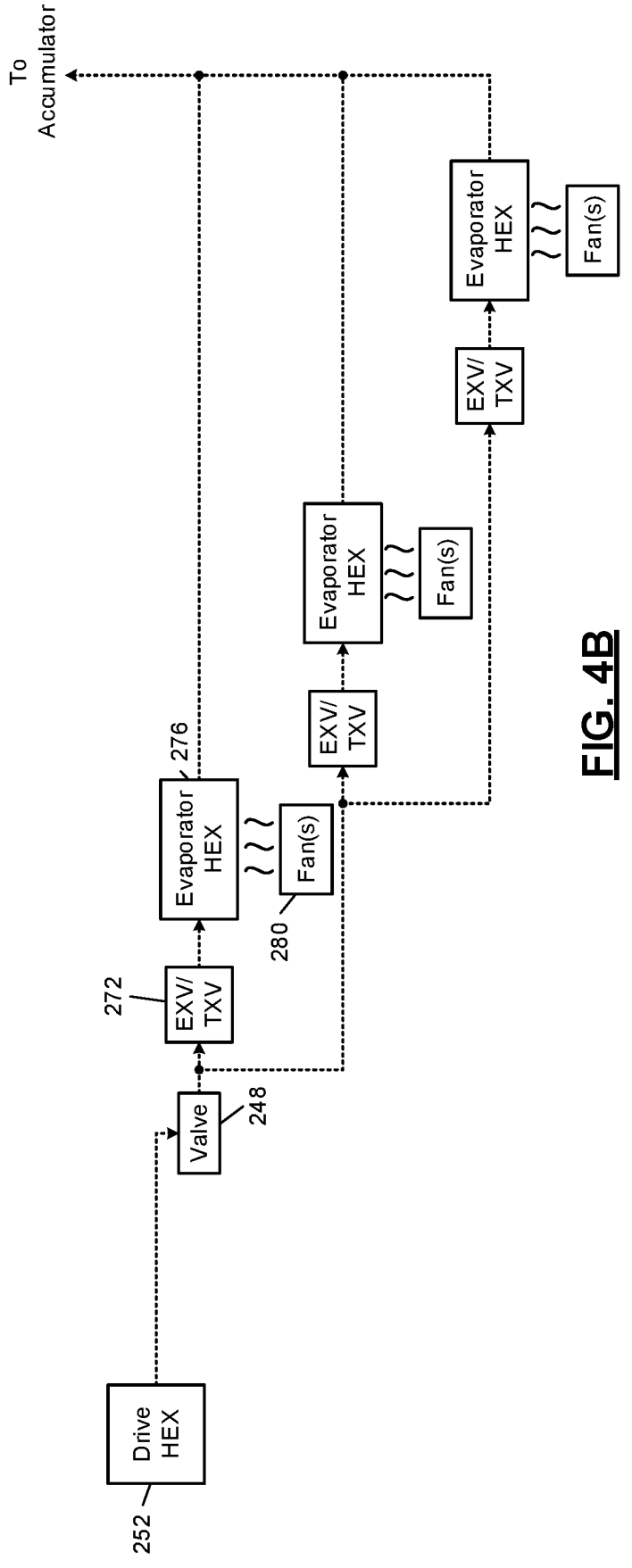
FIG. 4B includes a functional block diagram of a portion of an example refrigeration system including multiple evaporator systems.

Additionally or alternatively to having one or multiple eutectic plates, the refrigeration system 124 may include more than one evaporator HEX, such as two, three, four, five, six, or more evaporator HEXs. For example, different evaporator HEXs may be provided for different sections of the refrigerated space 128. One expansion valve and one or more evaporator fans may be provided for each evaporator HEX. FIG. 4B includes a functional block diagram of a portion of an example refrigeration system including three evaporator HEXes.

Some vehicles may include two or more refrigerated spaces, but only include an evaporator (or multiple) and a eutectic plate (or multiple) in one of the refrigerated spaces. A damper door or another suitable actuator may be provided to open and close the one refrigerated space having the evaporator and eutectic plate(s) to and from one or more other refrigerated spaces not having an evaporator or a eutectic plate(s) (i.e., not having any evaporators and not having any eutectic plates). The control module 260 may control opening and closing of such a damper door or actuator, for example, based on maintaining a temperature within the other refrigerated space based on a setpoint for that other refrigerated space.

Figure 5:
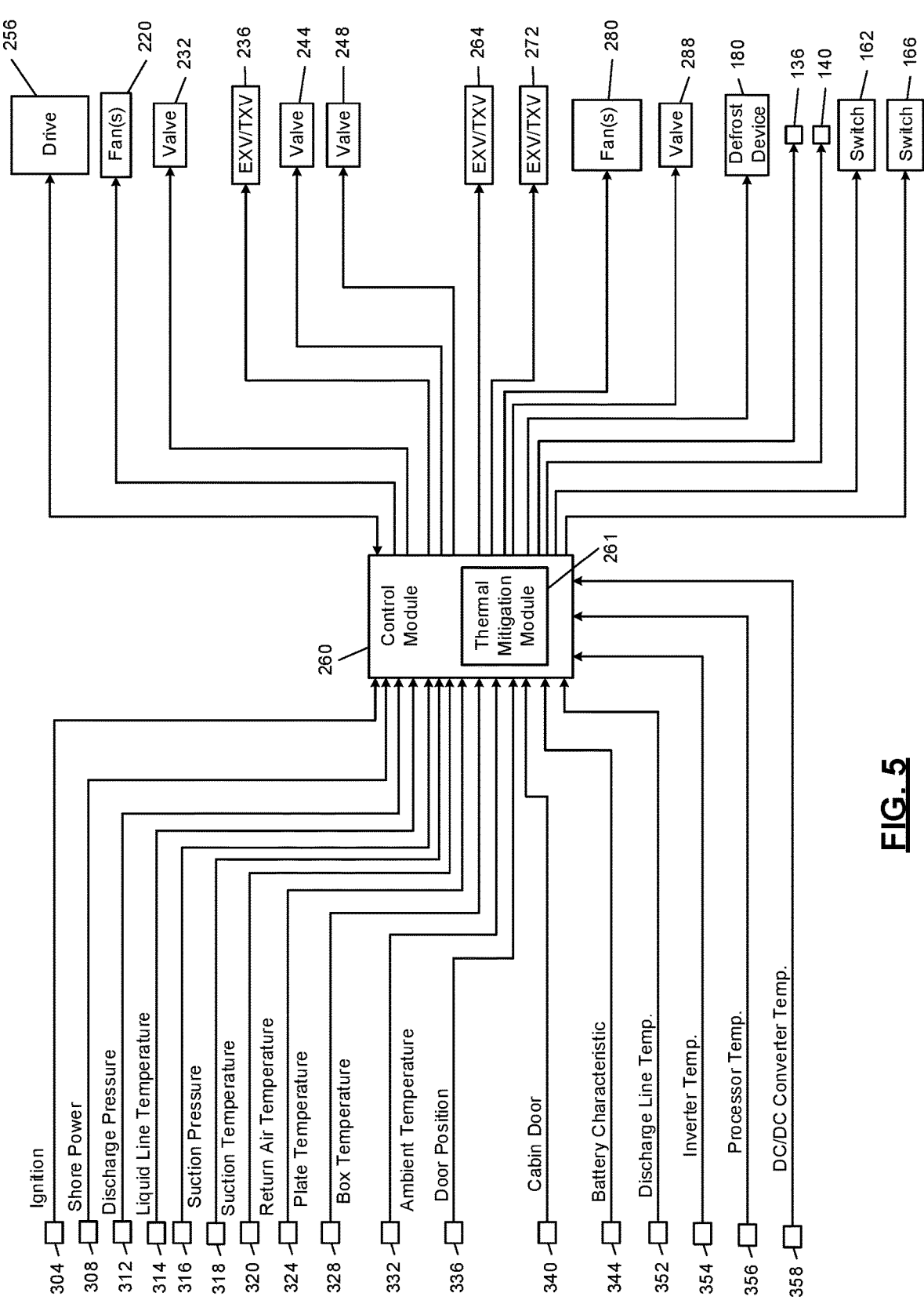
FIG. 5 includes a functional block diagram of an example system including the control and thermal mitigation modules, sensors of the vehicle, and actuators of the vehicle.

FIG. 5 includes a functional block diagram of an example system including the control module 260 having the thermal mitigation module 261, various sensors of the vehicle 100, and various actuators of the vehicle 100. The control module 260 and/or the thermal mitigation module 261 receive various measured parameters and indications from sensors of the vehicle 100. The control module 260 and/or the thermal mitigation module 261 control actuators and/or electronic components of the vehicle 100 based on the various measured parameters and/or parameters derived based on the various measured parameters. As an example, the control module 260 may be an PRO series control module (e.g., 100 series, 200 series, 4 DIN series, 10 DIN series) by Dixell S.r.l., located in Pieve d'Alpago (BL) Italy. One example is an PRO IPG115D control module, however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON may indicate that that a refrigeration system (discussed further below) is being or can be powered via a charging system powered by the engine 104. A driver may turn the ignition system of the vehicle 100 OFF and shut down the engine 104, for example, by actuating the ignition key, button, or switch.

A shore power sensor 308 indicates whether the vehicle 100 is receiving shore power via the receptacle 154.

A discharge pressure sensor 312 measures a pressure of refrigerant output by the compressor 204 (e.g., in the discharge line). The pressure of refrigerant output by the compressor 204 can be referred to as discharge pressure.

A liquid line temperature sensor 314 measures a temperature of liquid refrigerant output from the condenser HEX 212 (e.g., in the liquid line). The temperature of refrigerant output by the condenser HEX 212 can be referred to as liquid line temperature. The control module 260 may determine a subcooling value based on the liquid line temperature. The control module may determine a refrigerant charge level based on the subcooling value. While one example location of the liquid line temperature sensor 314 is shown, the liquid line temperature sensor 314 may be located at another location where liquid refrigerant is present in the refrigerant path from the condenser HEX 212 to the evaporator HEX 276 (and the eutectic plate(s) 268).

A suction pressure sensor 316 measures a pressure of refrigerant input to the compressor 204 (e.g., in the suction line). The pressure of refrigerant input to the compressor 204 can be referred to as suction pressure.

A suction temperature sensor 318 measures a temperature of refrigerant input to the compressor 204 (e.g., in the suction line). The temperature of refrigerant input to the compressor 204 can be referred to as suction temperature. The control module 260 may determine a superheat value at the compressor 204. The control module 260 may detect and/or predict the presence of a liquid floodback condition based on the superheat value.

A return air temperature sensor 320 measures a temperature of air input to the evaporator HEX 276. The temperature of air input to the evaporator HEX 276 can be referred to as return air temperature (RAT). One return air temperature sensor may be provided for each set of one or more evaporator HEX and one or more eutectic plates.

A plate temperature sensor 324 measures a temperature of the eutectic plate(s) 268. The temperature of the eutectic plate(s) 268 can be referred to as a plate temperature.

A box temperature sensor 328 measures a temperature within the refrigerated space 128. The temperature within the refrigerated space 128 can be referred to as a box temperature. One or more box temperature sensors may be provided and measure a box temperature within each different portion of the refrigerated space 128.

An ambient temperature sensor 332 measures a temperature of ambient air at the location of the vehicle 100. This temperature can be referred to as ambient air temperature. In various implementations, the control module 260 may receive the ambient air temperature from an engine control module (ECM) that controls actuators of the engine 104.

A door position sensor 336 indicates whether the door 132 is closed or open. An indication that the door 132 is open may mean that the door 132 is at least partially open (i.e., not closed), while an indication that the door 132 is closed may mean that the door 132 is fully closed. One or more door position sensors may be provided for each door to the refrigerated space 128.

A cabin door sensor 340 indicates whether the doors of the passenger cabin have been commanded to be locked or unlocked. A driver may command unlocking and locking of the doors of the passenger cabin, for example, via a wireless key fob. As discussed above, the control module 260 may actuate the unlock actuator 136 to unlock the door(s) to the refrigerated space 128 when the driver commands unlocking of the doors passenger cabin. The control module 260 may actuate the lock actuator 140 to lock the door(s) to the refrigerated space 128 when the driver commands locking of the doors of the passenger cabin.

A battery sensor 344 measures a characteristic of a battery of the battery pack 120, such as voltage, current, and/or temperature. In various implementations, a voltage sensor, a current sensor, and/or a temperature sensor may be provided with each battery of the battery pack 120.

A discharge line temperature sensor 352 measures a temperature of refrigerant output by the compressor 204 (e.g., in the discharge line). The temperature of refrigerant output by the compressor 204 can be referred to as discharge line temperature (DLT). In various implementations, the discharge line temperature sensor 352 may provide the DLT to the drive 256, and the drive 256 may communicate the DLT to the control module 260.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304, the shore power sensor 308, the door position sensor 336 may be digital sensors. The discharge pressure sensor 312, the suction pressure sensor 316, the return air temperature sensor 320, the plate temperature sensor 324, the box temperature sensor 328, the ambient temperature sensor 332, the battery sensor 344, and the discharge line temperature sensor 352 may be analog sensors.

As discussed further below, the control module 260 controls actuators of the refrigeration system 124 based on various measured parameters, indications, setpoints, and other parameters.

For example, the control module 260 may control the motor 216 of the compressor 204 via the drive 256. The control module 260 may control the condenser fan(s) 220. The condenser fan(s) 220 may be fixed speed, and the control module 260 may control the condenser fan(s) 220 to be either ON or OFF. Alternatively, the condenser fan(s) 220 may be variable speed, and the control module 260 may determine a speed setpoint for the condenser fan(s) 220 and control the condenser fan(s) 220 based on the speed setpoint, for example, by applying a pulse width modulation (PWM) signal to the condenser fan(s) 220.

The control module 260 may also control the EVI valve 232. For example, the control module 260 may control the EVI valve 232 to be open to enable EVI or closed to disable EVI. In the example of the expansion valve 236 being an EXV, the control module 260 may control opening of the expansion valve 236.

The control module 260 may also control the plate control valve 244. For example, the control module 260 may control the plate control valve 244 to be open to enable refrigerant flow through the eutectic plate(s) 268 or closed to disable refrigerant flow through the eutectic plate(s) 268. In the example of the expansion valve 264 being an EXV, the control module 260 may control opening of the expansion valve 264.

The control module 260 may also control the evaporator control valve 248. For example, the control module 260 may control the evaporator control valve 248 to be open to enable refrigerant flow through the evaporator HEX 276 or closed to disable refrigerant flow through the evaporator HEX 276. In the example of the expansion valve 272 being an EXV, the control module 260 may control opening of the expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the refrigeration system 124 after the HPCO 262 closes in response to the discharge pressure falling below than the predetermined pressure. In various implementations, the control module 260 may also require that one or more operating conditions be satisfied before enabling operation of the refrigeration system 124 after the HPCO 262 closes.

The control module may control the evaporator fan(s) 280. The evaporator fan(s) 280 may be fixed speed, and the control module 260 may control the evaporator fan(s) 280 to be either ON or OFF. Alternatively, the evaporator fan(s) 280 may be variable speed, and the control module 260 may determine a speed setpoint for the evaporator fan(s) 280 and control the evaporator fan(s) 280 based on the speed setpoint, for example, by applying a PWM signal to the evaporator fan(s) 280.

In cases where the CPR valve 288 is used and the CPR valve 288 is an electronic CPR valve, the control module 260 may also control the CPR valve 288. For example, the control module 260 may actuate the CPR valve 288 to limit the suction pressure during startup and later open the CPR valve 288.

The control module 260 may also control operation of the defrost device 180 by activating or deactivating the defrost device 180.

The control module 260 may also control the switches 162 and 166. For example, the control module 260 may switch the switch 162 from the closed state to the open state and switch the switch 166 from the open state to the closed state when the ignition system of the vehicle 100 is OFF and shore power is connected to the vehicle 100 via the receptacle 154. The control module 260 may switch the switch 162 from the open state to the closed state and switch the switch 166 from the closed state to the open state when the ignition system of the vehicle 100 is ON. This may be the case regardless of whether shore power is or is not connected to the vehicle 100. The switches 162 and 166 may be active switches, for example, so the control module 260 can ensure that both switches 162 and 166 are not both in the closed state at the same time.

In various implementations, the switches 162 and 166 may be passive devices configured to have opposite open and closed states based on whether shore power is connected to the vehicle 100. For example, the switch 166 may transition to the closed state and the switch 162 may transition to the open state when shore power is connected to the vehicle 100. The switch 166 may transition to the open state and the switch 162 may transition to the closed state when shore power is not connected to the vehicle 100.

Figure 8:
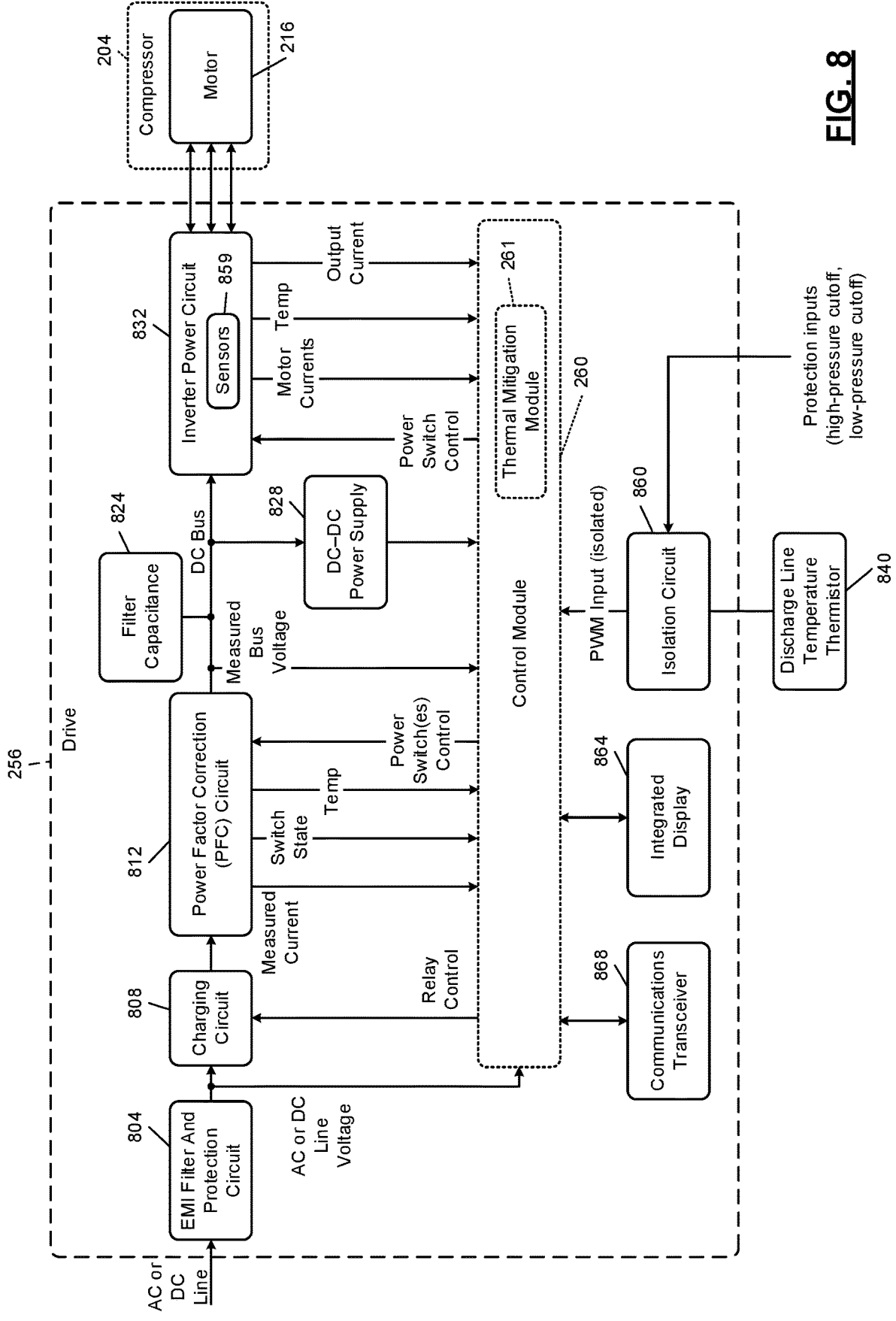
FIG. 8 is a block diagram of an example implementation of the compressor motor drive of FIG. 1.
Figure 9:
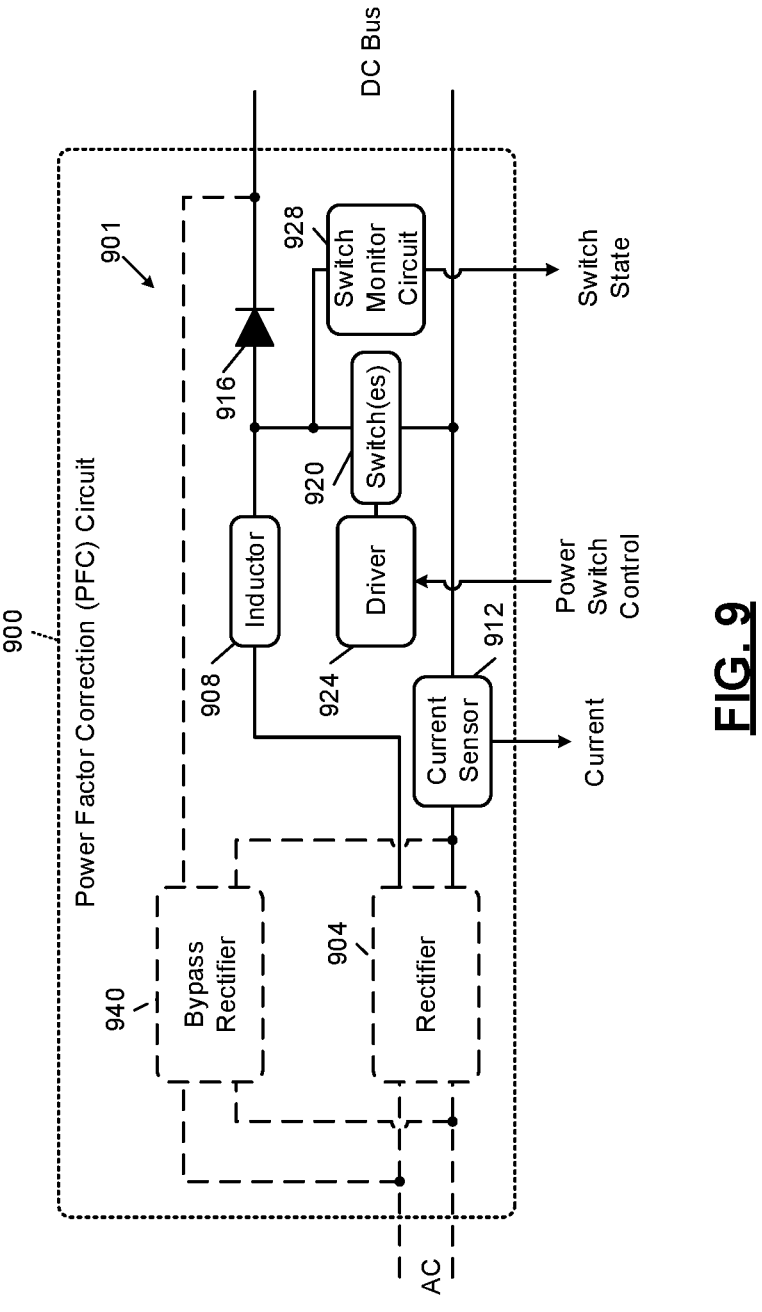
FIG. 9 is a block diagram of an example implementation of the power factor correction (PFC) circuit of FIG. 8.

The sensors may further include an inverter temperature sensor 354, a processor temperature sensor 356, and/or a DC/DC converter temperature sensor 358, which may be respectively included in and/or attached to an inverter (e.g., inverter 832 of FIG. 8), the control module 260 and/or a DC/DC converter (e.g., DC/DC converter 901 shown in FIG. 9). The thermal mitigation module may control operation of the drive 256 and the motor 216 based on temperatures indicated by at least the sensors 332, 354, 356, 358.

Figure 6:
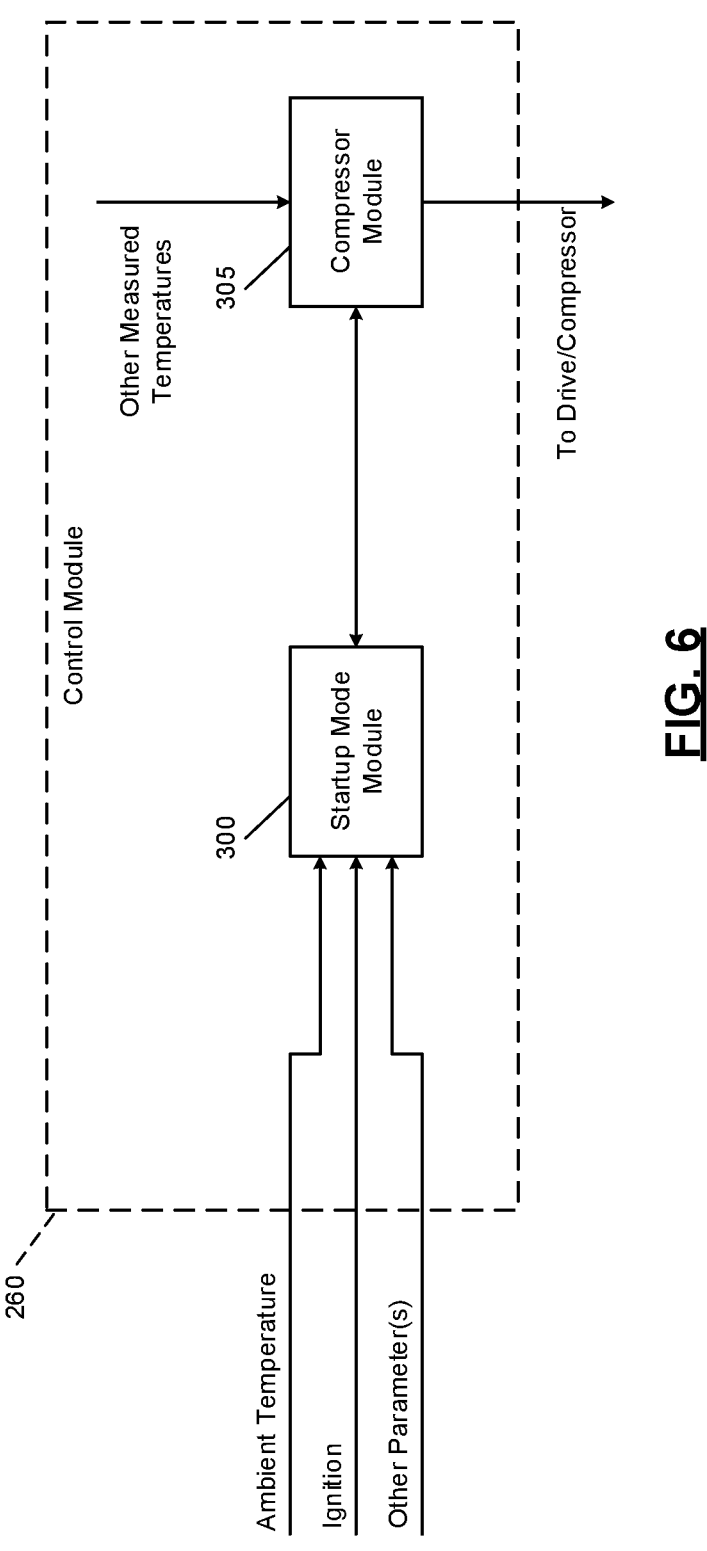
FIG. 6 includes a functional block diagram of an example control module implementing startup control.

Referring now to FIG. 6, a functional block diagram of an example of the control module 260 implementing the startup logic is shown. For example, the control module 260 includes a startup mode control module 300 and a compressor module 305. The startup mode module 300 monitors one or more conditions of the vehicle 100 and/or the refrigeration system 124 as described below in more detail (e.g., compressor off time, ambient temperature, inverter temperature, processor temperature, DC/DC converter temperature, etc.) to determine whether a startup will be performed. For example, the startup mode module 300 determines whether a startup will be performed in response to the vehicle 100 and the refrigeration system 124 being powered on (e.g., in response to a signal indicating the ignition system has been turned ON), and/or in response to any command to turn the compressor 204 on. The startup mode control module 300 initiates a normal startup (i.e., a normal startup mode) or refrains from starting the corresponding compressor motor drive and/or compressor depending on current conditions. For example, the startup mode module 300 provides an indication of the selected startup mode to the compressor module 305. The compressor module 305 outputs one or more control signals to the drive 256, the HPCO 262, etc. to control operation of the compressor 204 according to the selected startup mode. For example, in the normal startup mode, the compressor 204 may be operated according to capacity and runtime requirements of the refrigeration system 124.

Figure 7:
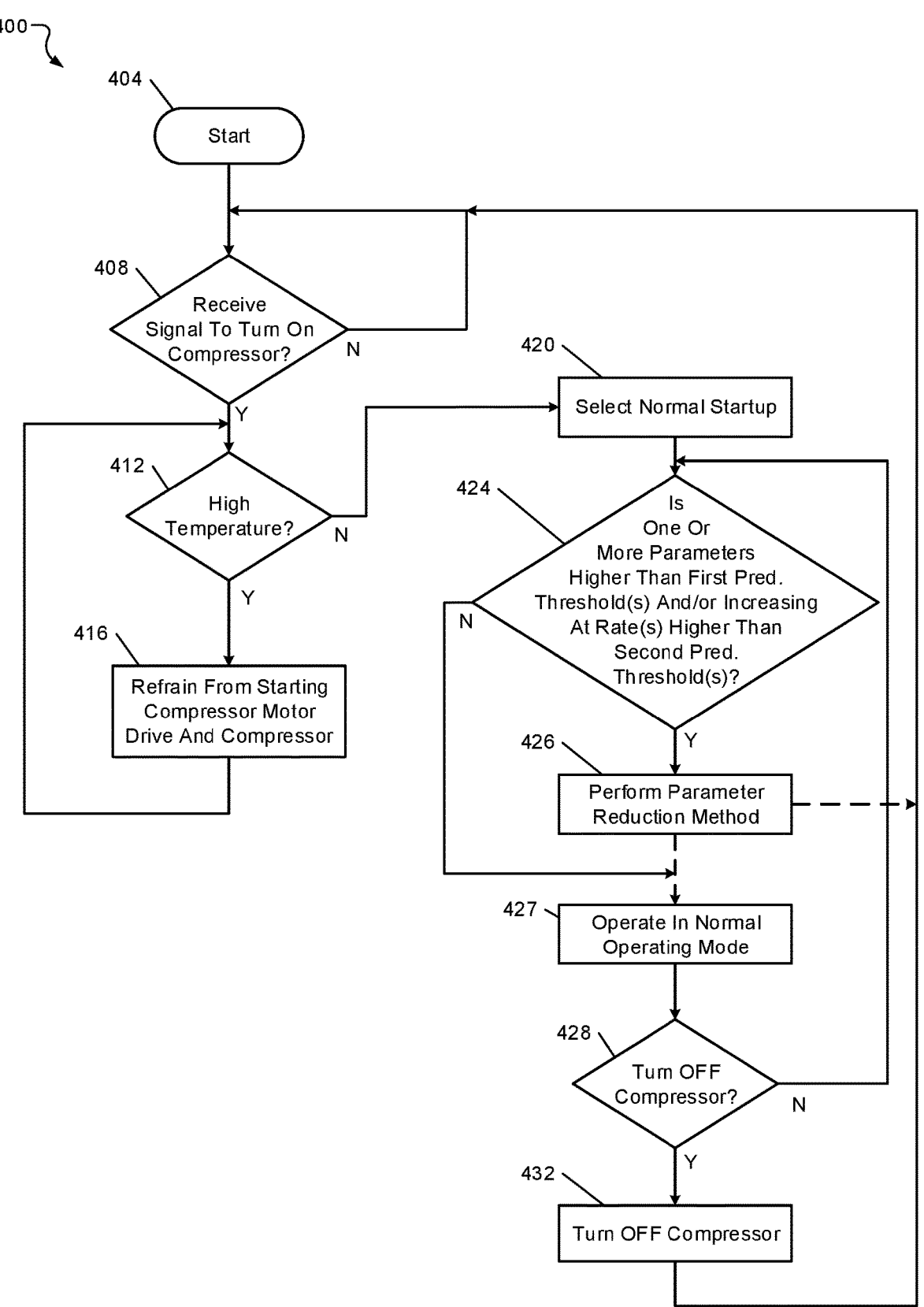
FIG. 7 includes a flow diagram illustrating a compressor motor drive startup method.

Referring now to FIG. 7, an example method 400 for selectively operating a compressor motor drive and/or a compressor. The method may begin at 404.

At 408, the control module 260 (e.g., the startup mode control module 300) determines whether a signal has been received to turn on the compressor 204 (e.g., a signal received in response to the vehicle 100 and/or the refrigeration system 124 being turned ON or a command received to turn ON the compressor 204 subsequent to a period that the compressor 204 was OFF, etc.). If true, the operation 412 may be performed.

At 412, the control module 260 determines whether high temperature condition exists. For example, the control module 260 may determine whether the ambient temperature, the inverter temperature, the processor temperature, and/or the DC/DC converter temperature are above predetermined thresholds (or limits). If yes, operation 416 may be performed, otherwise operation 420 may be performed.

At 416, the control module 260 refrains from starting compressor motor drive and compressor. Operation 412 may be performed subsequent to operation 416.

At 420, the control module 260 operates in the normal startup mode. For example, the startup mode control module 300 provides an indication to the compressor module 305 that the normal startup mode was selected, and the compressor module 305 controls the compressor 204 according to operating parameters associated with the normal startup mode. In some examples, the normal startup mode includes operating the compressor 204 in an initial low speed mode (e.g., with the compressor 204 being operated at a minimum speed) for a predetermined startup period (e.g., 2 minutes) prior to transitioning to a normal operating mode.

At 424, the control module 260 and/or the compressor module 305 may determine whether one or more parameters (e.g., one or more temperatures and/or motor drive current) are greater than respective first predetermined thresholds and/or increasing at rate(s) higher than second predetermined thresholds. If yes operation 426 may be performed, otherwise operation 427 may be performed.

At 426, the control module 260 and/or the compressor module 305 may perform a parameter reduction method, such as any of the parameters reduction methods described below and described with respect to FIGS. 10-13. During the parameter reduction method, parameters, such as DC bus voltage, drive switching frequency and/or compressor motor speed may be temporarily be reduced to reduce one or more parameters such as temperature and current. This is further described below.

Operation 427 may be performed subsequent to operation 426, if the compressor motor is not turned OFF during operation 426. For example, the control module 260 and/or the compressor module 305 may determine, during operation 426, that the parameter reduction method has been unable to reduce a parameter adequately and turn OFF the compressor motor. In this case, operation 408 may be performed subsequent to operation 426.

At 427, the control module 260 and/or the compressor module 305 may operate in a normal operating mode to satisfy load demands. Parameters, such as DC bus voltage, drive switching frequency and/or compressor motor speed may not be reduced as during operation 426.

At 428, the control module 260 determines whether to turn OFF the compressor 204. For example, the compressor module 305 may determine that a capacity need of the refrigeration system 124 has been met, a maximum run time of the compressor 204 has been met, etc. and proceed to operation 432. If false, operation 424 may be performed. At 432, the control module 260 and/or the compressor module 305 turns OFF the compressor 204 and returns to operation 408.

In FIG. 8, an example implementation of the drive 256 may include an electromagnetic interference (EMI) filter and protection circuit 804, which receives power from an alternating current (AC) or DC line. The EMI filter and protection circuit 804 reduces EMI that might otherwise be injected back onto the AC or DC line from the drive 256. The EMI filter and protection circuit 804 may also remove or reduce EMI arriving from the AC or DC line. Further, the EMI filter and protection circuit 804 protects against power surges, such as may be caused by lightening, and/or other other types of power surges and sags.

A charging circuit 808 controls power supplied from the EMI filter and protection circuit 804 to a power factor correction (PFC) circuit 812. For example, when the drive 256 initially powers up, the charging circuit 808 may place a resistance in series between the EMI filter and protection circuit 804 and the PFC circuit 812 to reduce the amount of current inrush. These current or power spikes may cause various components to prematurely fail.

After initial charging is completed, the charging circuit 808 may close a relay that bypasses the current-limiting resistor. For example, the control module 260 may provide a relay control signal to the relay within the charging circuit 808. In various implementations, the control module 260 may assert the relay control signal to bypass the current-limiting resistor after a predetermined period of time following start up, or based on closed loop feedback indicating that charging is near completion.

The PFC circuit 812 converts incoming AC or DC power to DC power. The output DC power may have voltage ripples, which are reduced by filter capacitor 824. Filter capacitor 824 may include one or more capacitors arranged in parallel and connected to the DC bus. The PFC circuit 812 may attempt to draw current from the AC or DC line in a sinusoidal pattern that matches the sinusoidal pattern of the incoming voltage. As the sinusoids align, the power factor approaches one, which represents the greatest efficiency and the least demanding load on the AC or DC line.

The PFC circuit 812, if implemented as an active PFC circuit, may include (i) one or more switches, (ii) a rectification circuit, and/or (iii) an AC choke or a DC choke depending on whether AC or DC power is received and whether the choke is upstream or downstream of a rectification circuit. The PFC circuit 812 includes one or more switches that are controlled by the control module 260 using one or more signals labeled as power switch(es) control. The switches are controlled by the control module 260 using one or more signals labeled as power switch(es) control. The control module 260 determines the power switch(es) control signals based on a measured voltage of the DC bus, measured current in the PFC circuit 812, AC or DC line voltages, temperature or temperatures of the PFC circuit 812, and the measured state of a power switch in the PFC circuit 812. While the example of use of measured values is provided, the control module 260 may determine the power switch(es) control signals based on an estimated voltage of the DC bus, estimated current in the PFC circuit 812, estimated AC or DC line voltages, estimated temperature or temperatures of the PFC circuit 812, and/or the estimated or expected state of a power switch in the PFC circuit 812. In various implementations, the AC or DC line voltages are measured or estimated subsequent to the EMI filter and protection circuit 804 but prior to the charging circuit 808. In various implementations, the AC or DC line voltages are measured subsequent to the EMI filter and protection circuit 804 but prior to the charging circuit 808.

The control module 260 is powered by a DC-DC power supply 828, which provides a voltage suitable for logic of the control module 260, such as 3.3 Volts, 2.5 Volts, etc. The DC-DC power supply 828 may also provide DC power for operating switches of the PFC circuit 812 and an inverter power circuit 832 (also referred to as an inverter). For example only, this voltage may be a higher voltage than for digital logic, with 15 Volts being one example.

The inverter power circuit 832 also receives power switch(es) control signals from the control module 260. In response to the power switch(es) control signals, switches within the inverter power circuit 832 cause current to flow in respective windings of a motor 216 of the compressor 204. The control module 260 may receive a measurement or estimate of motor current for each winding of the motor 216 or each leg of the inverter power circuit 832. The control module 260 may also receive a temperature indication from the inverter power circuit 832.

For example only, the temperature from the inverter power circuit 832 and the temperature from the PFC circuit 812 are used only for fault purposes. In other words, once the temperature exceeds a predetermined threshold, a fault is declared and the drive 256 is either powered down or operated at a reduced capacity. For example, the drive 256 may be operated at a reduced capacity and if the temperature does not decrease at a predetermined rate, the drive 256 transitions to a shutdown state. The inverter power circuit 832 may include one or more current sensors 859 for detecting current out of the inverter power circuit 832 and drawn by the motor 216.

The control module 260 may also receive an indication of the discharge line temperature from the compressor 204 using the thermistor 840. An isolation circuit 860 may provide a pulse-width-modulated representation of the resistance of the thermistor 840 to the control module 260. The isolation circuit 860 may include galvanic isolation so that there is no electrical connection between the thermistor 840 and the control module 260.

The isolation circuit 860 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 860, the isolation circuit 860 ceases sending the PWM temperature signal to the control module 260. Therefore, the control module 260 may infer that a protection input has been received from an absence from the PWM signal. The control module 260 may, in response, shut down the drive 256.

The control module 260 controls an integrated display 264, which may include a grid of LEDs and/or a single LED package, which may be a tri-color LED. The control module 260 can provide status information, such as firmware versions, as well as error information using the integrated display 864. The control module 260 communicates with external devices using a communications transceiver 868. For example only, the communications transceiver 868 may conform to the RS-485 or RS-232 serial bus standards or to the Controller Area Network (CAN) bus standard.

In FIG. 9, a PFC circuit 900 is one implementation of the PFC circuit 812 of FIG. 8 and includes a DC/DC converter 901. The PFC circuit 900 may include a rectifier 904 that converts incoming AC into pulsating DC or may not include a rectifier and receive a DC voltage. The rectifier 904 may include a full-wave diode bridge. The DC output of the rectifier 904 is across first and second output terminals. The first output terminal is connected to an inductor 908, while the second output terminal is connected to a current sensor 912. An opposite end of the inductor 908 is connected to a node that is common to the inductor 908, an anode of a diode 916, and first terminal of one or more switches 920. In one embodiment, a single switch is connected having first, second and control terminals. The control terminal is connected to an output of a driver 924.

The PFC circuit 900 generates a DC bus voltage, where the first terminal of the switch 920 is connected to a cathode of the diode 916 while a second terminal of the switch 920 is connected to an output terminal of the rectifier 904 via the current sensor 912. The current sensor 912 can therefore sense the current within the switch 920 as well as the current in the DC bus and current in the inductor 908. The second terminal of the switch 920 is also connected to a second output terminal of the rectifier 904 via the inductor 908.

A driver 924 receives the power switch(es) control signal from the control module 260 of FIG. 8 and rapidly charges or discharges a control terminal of the switch 920. For example, the switch 920 may be a field effect transistor with a gate terminal as the control terminal. The driver 924, in response to the power switch(es) control signal, charges or discharges the capacitor at the gate of the field effect transistor.

More specifically, the switch 920 may be a power metal-oxide-semiconductor field-effect transistor (MOSFET), such as the STW38N65M5 power MOSFET from STMicroelectronics. A switch monitor circuit 928 measures whether the switch is on or off. This closed loop control enables the control module 260 to determine whether the switch 920 has reacted to a command provided by the power switch(es) control signal and may also be used to determine how long it takes the switch 920 to respond to that control signal. The measured switch state is output from the switch monitor circuit 928 back to the control module 260. The control module 260 may update its control of the power switch(es) control signal to compensate for delays in turning on and/or turning off the switch 920.

In FIG. 9, the inductor, the switch 920, and the diode 916 are arranged in a boost configuration. In brief, the switch 920 closes, causing current through the inductor 908 to increase. When the switch 920 is closed, the current through the inductor 908 cannot change instantaneously because the voltage across an inductor is proportional to the derivative of the current. The voltage across the inductor 908 becomes negative, meaning that the end of the inductor 908 connected to the anode of the diode 916 increases above the voltage output from the rectifier 904.

Once the voltage at the anode of the diode 916 increases above the turn on voltage of the diode 916, the current through the inductor 908 can be fed through the diode 916 to the DC bus. The current through the inductor 908 decreases and then the switch 920 is closed once more, causing the current and the inductor 908 to increase.

In various implementations, the switch 920 may be turned on until the current sensor 912 determines that a predetermined threshold of current has been exceeded. At that time, a switch 920 is turned off for a specified period of time. This specified period may be adaptive, changing along with the voltage of the DC bus as well as the voltage of the AC input change. However, the off time (when the switch 920 is open) is a specified value. Once a time equal to the specified value has elapsed, the switch 920 is turned back on again and the process repeats. The off time can be fixed or variable. In the case of the off time being variable, the off time can be limited to at least a predetermined minimum off time.

To reduce the physical size and parts cost of the PFC circuit 900, the inductance of the inductor 908 (which may be the largest contributor to physical size of the PFC circuit 900) may be lowered. However, with a lower inductance, the inductor 908 will saturate more quickly. Therefore, the switch 920 will have to operate more quickly. While more quickly and smaller are relative terms, present power switching control operates in the range of 10 kilohertz to 20 kilohertz switching frequencies. In the present application, the switching frequency of the switch 920 may be increased to more than 50 kilohertz, more than 100 kilohertz, or more than 200 kilohertz. For example, the switching frequency of the switch may be controlled to be approximately 200 kilohertz.

The switch 920 is therefore chosen to allow for faster switching as well as to have low switching losses. With faster switching, the inductance of the inductor 908 can be smaller. In addition, the diode 916 may need to be faster. Silicon carbide diodes may have fast response times. For example, the diode 916 may be a STPSC2006CW Silicon Carbide dual diode package from STMicroelectronics.

In order to accurately drive the switch 920 when operating at higher speeds, the control strategy must similarly be accelerated. For example only, the control module 260 may include multiple devices, such as a microprocessor configured to perform more involved calculations and an FPGA (field programmable gate array) or PLD (programmable logic device) configured to monitor and respond to inputs in near real time. In this context, near real time means that the time resolution of measurement and delay in responding to inputs of the FPGA or PLD is negligible compared to the timeframes of interest.

A bypass rectifier 940 is connected in parallel with the rectifier 904 at the AC line input. A second output terminal of the bypass rectifier 940 is connected to the second terminal rectifier 904. However, a first output terminal of the bypass rectifier 940 is connected to the cathode of the diode 916.

As a result, when the PFC circuit 900 is not operating to boost the DC bus voltage, the bypass rectifier 940 will be active when the line-to-line voltage of the AC input exceeds the voltage across the DC bus. The bypass rectifier 940, in these situations, diverts current from passing through the diode 916. Because the inductor 908 is small, and the switch 920 switches rapidly, the diode 916 is selected to also exhibit fast switching times. The diode 916 may therefore be more sensitive to current, which is selectively shunted around the diode 916 by the bypass rectifier 940.

In addition, the current path through the rectifier 904 and the diode 916 experiences three diode voltage drops or two diode voltage drops and the switch voltage drop, while the path through the bypass rectifier 940 experiences only two diode voltage drops. While the single phase AC input in FIG. 9 is associated with a boost converter topology, the present disclosure also encompasses a buck converter topology or a buck-boost converter topology.

Figure 10:
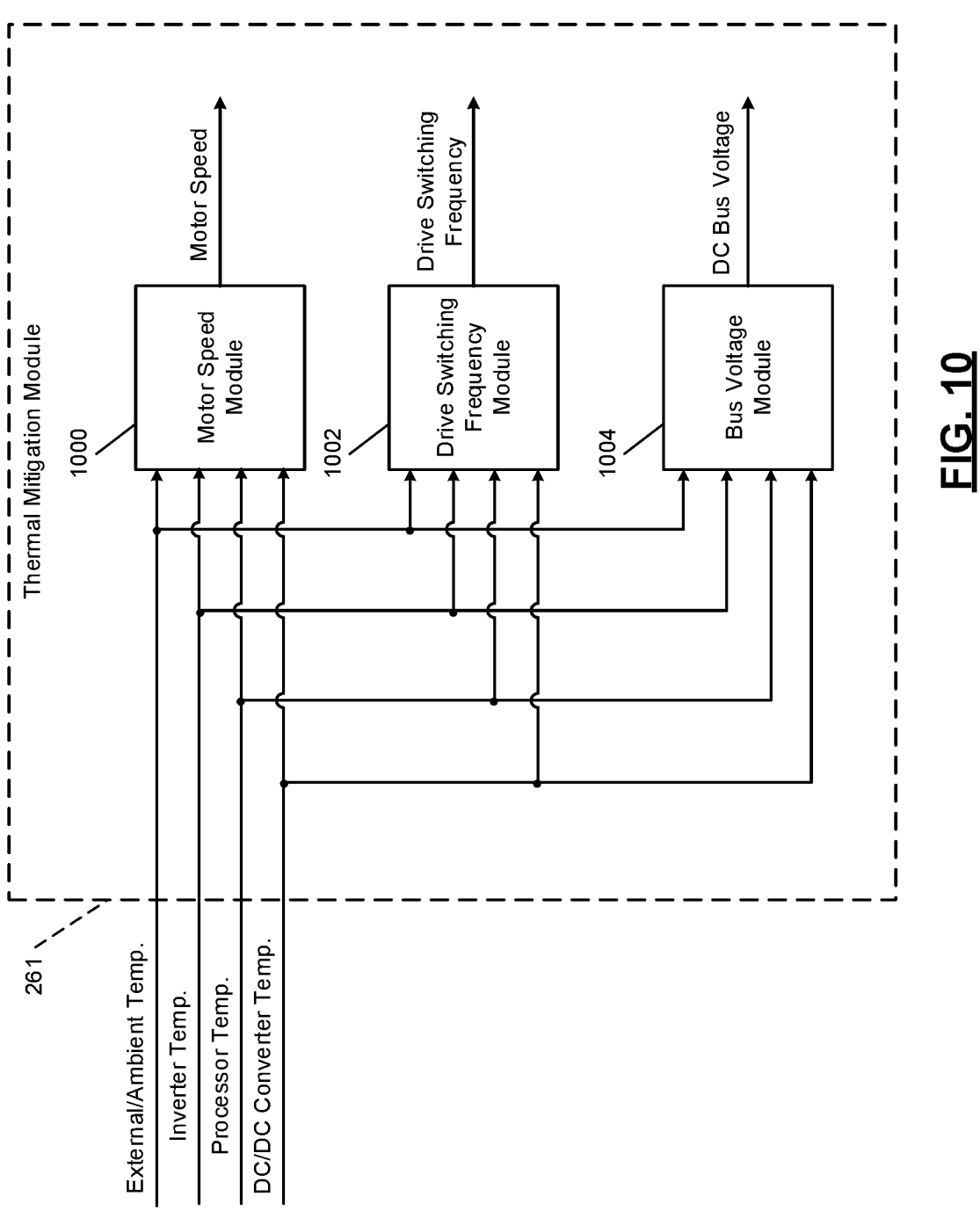
FIG. 10 is a block diagram of an example implementation of the thermal mitigation module of FIGS. 1A, 1B, 3, 5 and 8.

FIG. 10 shows the thermal mitigation module 261 of FIGS. 1A, 1B, 3 and 8. The thermal mitigation module 261 may include a motor speed module 1000, a drive switching frequency module 1002 and a bus voltage module 1004.

The motor speed module 1000 determines a speed of a motor, such as the compressor motor 216 of FIG. 5 based on one or more parameters, such as an external (or Ambient) temperature, a temperature of an inverter (e.g., the inverter power circuit 832 of FIG. 8), a temperature of a processor (e.g., the control module 260), a temperature of a converter (e.g., one of the converters referred to herein), and/or other parameters (e.g., a current level of current supplied to the compressor). The drive switching frequency module 1002 determines a drive switching frequency based on one or more parameters, such as the external (or Ambient) temperature, the temperature of an inverter (e.g., the inverter power circuit 832 of FIG. 8), the temperature of a processor (e.g., the control module 260), the temperature of a converter (e.g., one of the converters referred to herein), and/or other parameters (e.g., a current level of current supplied to the compressor). The bus voltage module 1004 determines a voltage of the DC bus of FIGS. 8-9 based on one or more parameters, such as the external (or Ambient) temperature, the temperature of an inverter (e.g., the inverter power circuit 832 of FIG. 8), the temperature of a processor (e.g., the control module 260), the temperature of a converter (e.g., one of the DC/DC converters referred to herein), and/or other parameters (e.g., a current level of current supplied to the compressor).

Each of the modules 1000, 1002, 1004 may include similar functions for determining the motor speed, drive switching frequency and DC bus voltage as a function of different temperatures. As an example, each of the modules 1000, 1002, 1004, may include the parameter reduction system of FIG. 11A.

Figures 11A, 11B:
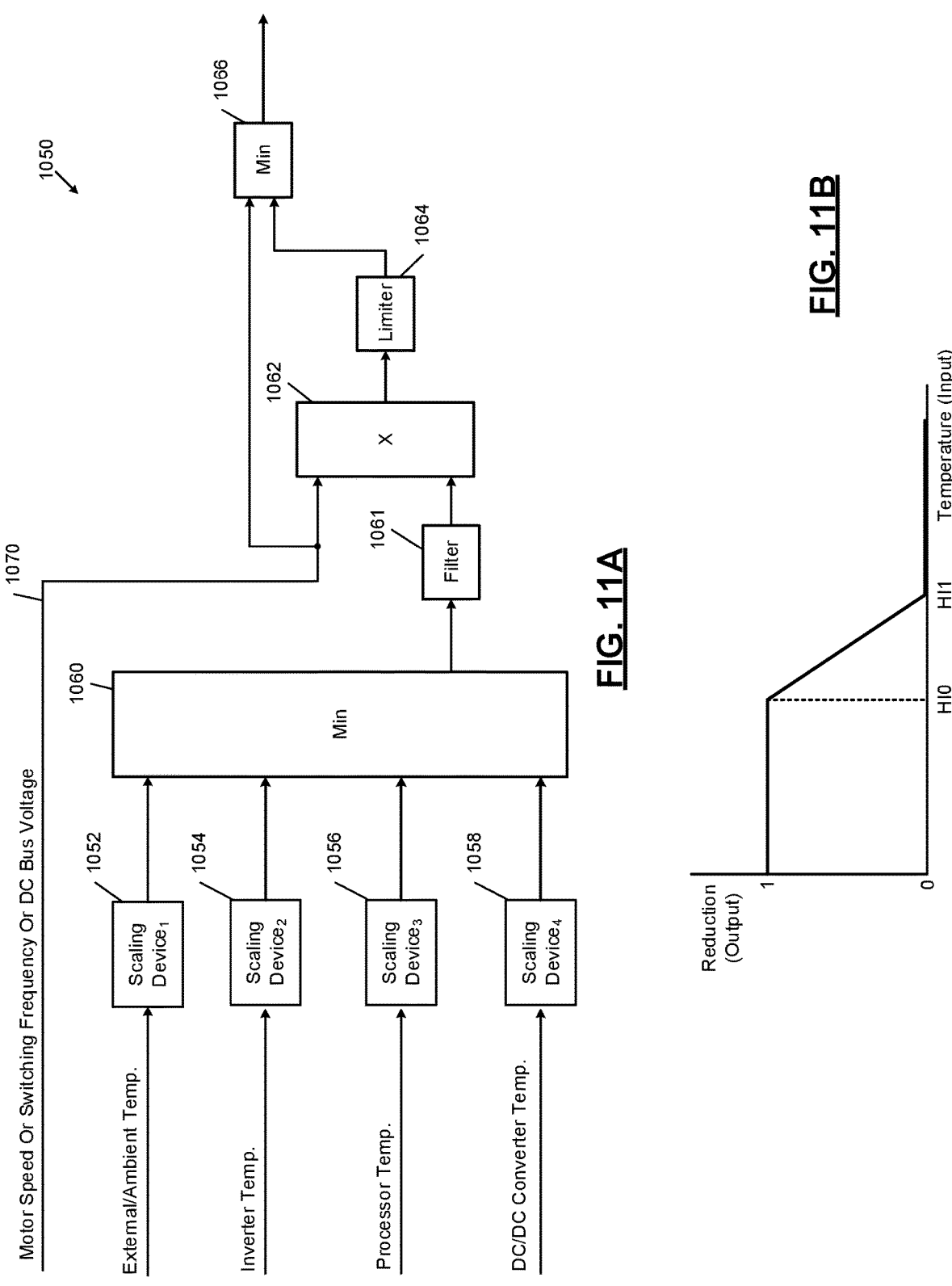
FIG. 11A is a functional block diagram of a parameter reduction system.
FIG. 11B is an example scalar plot implemented by one or more scaling devices of the parameter reduction system of FIG. 11A.

FIG. 11A shows a parameter reduction system 1050. The parameter reduction system 1050 includes scaling devices 1052, 1054, 1056, 1058, a first minimum device 1060, a filter 1061, a multiplier 1062, a limiter 1064 and a second minimum device 1066. The scaling devices 1052, 1054, 1056, 1058 operate according to a scaling plot. The scaling devices receive respective temperature values and scale the temperature values according to a respective scaling plot similar or the same as that shown in FIG. 11B. When a temperature value is received that is greater than a first temperature threshold (e.g., HI0) and less than a second temperature threshold (e.g., HI1), then the output of the scaling device is a value between 0-1. The output is 0 when the input temperature is less than or equal to HI0 and is 1 when the input temperature is greater than or equal to HI1.

The scaled output values of the scaling devices 1052, 1054, 1056, 1058 are provided to the first minimum device 1060. The first minimum device determines which of the received scaled output values is smallest and forwards that value to the filter 1061. The filter 1061 filters the output of the first minimum device 1060. The filter 1061 may be implemented as a low pass filter and have a transfer function represented by equation (1), where z is a sampled data frequency domain.

$$F(z)=z/(Temp\ Filter\_Constant+1)z-Temp\ Filter\_Constant \qquad (1)$$

The multiplier 1062 multiplies the output of the filter 1061, which is a filtered scalar value between 0-1, by a parameter 1070. The parameter 1070 may be a motor speed of a compressor motor, a switching frequency of one or more of the switches in the PFC circuit 812 and/or included in the switches 920 of FIGS. 8-9, or a DC bus voltage such as one of the DC bus voltages of the DC buses shown in FIGS. 8-9. This multiplication, depending on the value of the filtered scalar value, reduces the value of the parameter 1070, which is provided to the limiter 1064.

The output of the multiplier 1062 is provided to the limiter 1064 which includes an upper limit and a lower limit. If the output of the multiplier 1062 is greater than the upper limit, then the value is reduced to the upper limit. If the output of the multiplier 1062 is less than the lower limit, then the value us increased to the lower limit.

The output of the limiter 1064 is provided to the second minimum device 1066. The second minimum device 1066 selects the minimum of the parameter 1070 and the output of the limiter 1064.

The control module 260 and/or the compressor module 305 then sets, for example, the motor speed of the compressor, the switching frequency of the one or more switches of the 920 of FIG. 9, or the DC bus voltage of FIG. 9 to the output of the second minimum device 1066.

FIGS. 11A and 11B provide a parameter reduction method for reducing one of the stated parameters or another parameter. Implementation of the parameter reduction method by the modules 1000, 1002, 1004 of FIG. 10 allows for the motor speed, drive switching frequency and DC bus voltage to be reduced concurrently to reduce one or more of the stated temperatures. The parameters are reduced as a function of multiple different detected temperatures. Use of the scaling plot of FIG. 11B and/or the like provides a linear reduction in the stated parameters. As the temperatures decrease, use of the scaling plot may also be used to provide a linear increase in the stated parameters.

The 0 to 1 output of each of the scaling devices 1056 refers to a unitless scalar that is used to reduce drive switching frequency, DC bus voltage, and motor speed from a normal (or current) value due to temperature or current increasing above first predetermined thresholds and/or increasing at rates that are higher than second predetermined thresholds. The scalars of the sealing devices 1056 have positive minimum non-zero values. The maximum value of each of the scalars is 1. A scalar value of 1 represents operation at the normal (or current) value. The minimum values of the scalars may be limited to certain ranges. For example, the minimum switching frequency may be 45 kiloHertz (kHz)±5%. As an example, the switching frequency operating range may be 45-75 kHz. As another example, the DC bus voltage operating range may be 275-300V. As yet another example, the motor speed range may be 1200-7000 rpm. These ranges may vary depending on the compressor motor utilized.

Figure 12A:
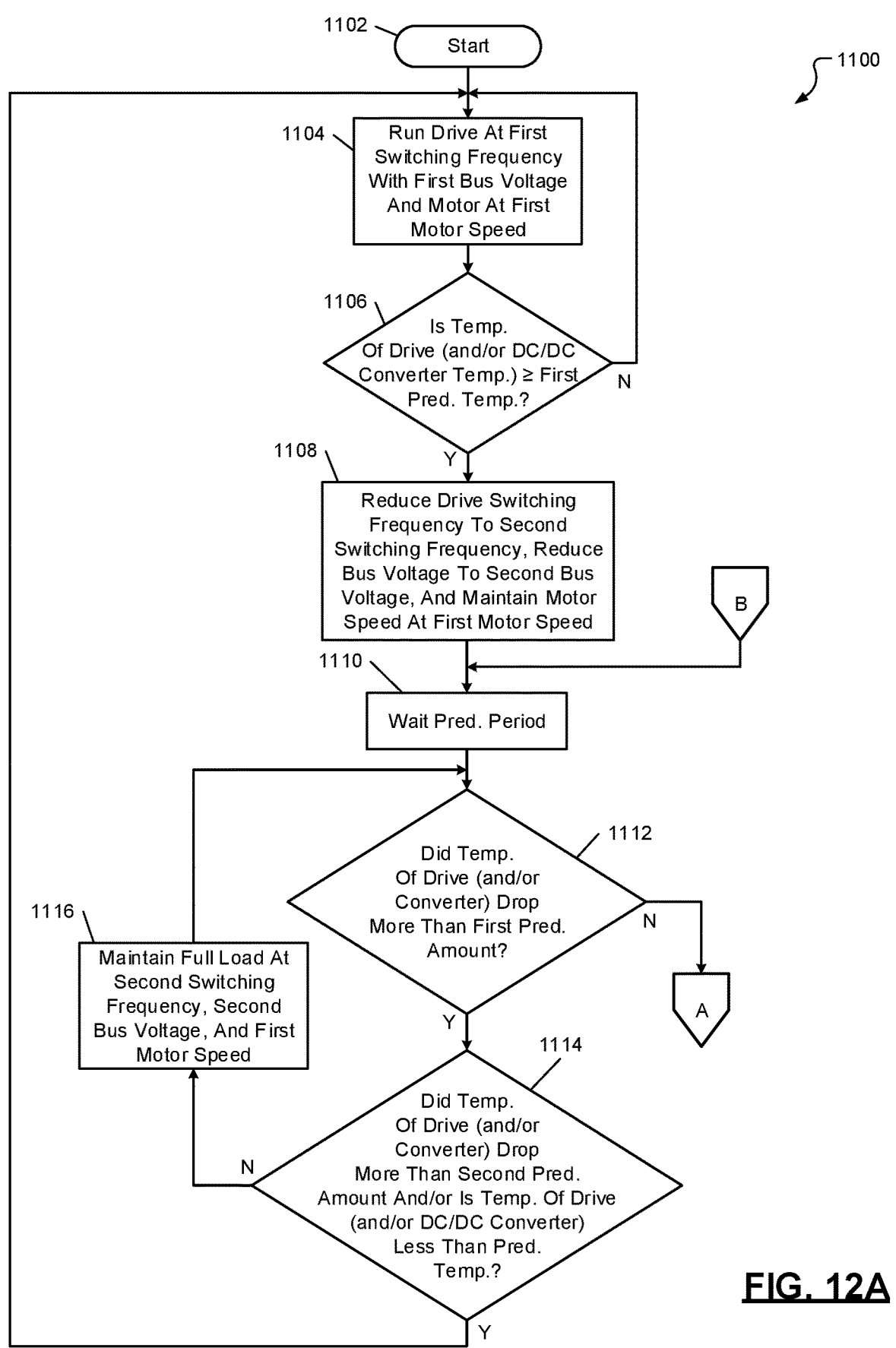
FIG. 12A-C illustrate a thermal control method in accordance with the present disclosure.

Although FIG. 10 shows the temperatures being concurrently monitored by the modules 1000, 1002, 1004, the reduction or increase in the parameters (motor speed, drive switching frequency, and bus voltage) may not occur concurrently. For example, one or more parameters may be reduced prior to one or more of the other parameters. Examples of this are illustrated by FIGS. 12A-13.

In addition, temperatures can be slow to react, thus in addition to or as an alternative to monitoring temperatures, current supplied to the compressor motor may also be monitored. The parameters (motor speed, drive switching frequency, and bus voltage) may be reduced or increased based on the current. For example, when current is above a predetermined threshold for a certain set of conditions, this can be an indication that one or more of the temperatures is about to increase to a point warranting a reduction in one or more of the stated parameters (motor speed, drive switching frequency, and bus voltage).

As another example, when a temperature exceeds a set threshold, the drive switching frequency and the DC bus voltage may be reduced to reduce DC-to-DC module losses. When the DC bus voltage is lowered, the inverter runs the compressor motor with more demagnetized current Id to phase advance the motor allowing the same torque with lower DC bus voltage, but higher root mean square (RMS) phase current. If this reduction does not stop the temperature from rising, the drive switching frequency and DC bus voltage are further reduced. This is continued if the temperature does not decrease until the drive switching frequency and the DC bus voltage reach set low end limits. The inverter switching frequency may be lowered when the DC bus voltage is lowered to reduce inverter losses especially when the DC bus voltage is lowered and the demagnetized current Id is increased. This may be done prior to reducing compressor motor speed.

If the low end limits are reached and the temperature is still increasing, then the compressor motor speed may be reduced in addition to the stated reductions in the drive switching frequency and the DC bus voltage. This may be done to further reduce the power flow through the drive, meaning current in the DC-to-DC converter is reduced. In general, reducing speed of the compressor motor reduces both DC-to-DC current and inverter current and may be the last action to be taken before "tripping off" (turning OFF the motor drive and/or compressor motor).

The amount of DC-to-DC current may be monitored in addition to monitoring the DC-to-DC converter temperature to "look ahead" and for "feedforward" reduction in the drive switching frequency, the DC bus voltage and/or the motor speed. The reduction in the drive switching frequency, the DC bus voltage and/or the motor speed may be linear, continuous, stepwise including discrete steps, or take on another format. The reduction in the drive switching frequency, the DC bus voltage and/or the motor speed may be performed in parallel, sequentially, and/or in a predetermined pattern.

If reduction in the drive switching frequency, the DC bus voltage and the motor speed to predetermined respective minimum thresholds does not reduce the one or more temperatures of concern, then the motor drive and/or the compressor motor may be deactivated (turned OFF).

Figure 12B:
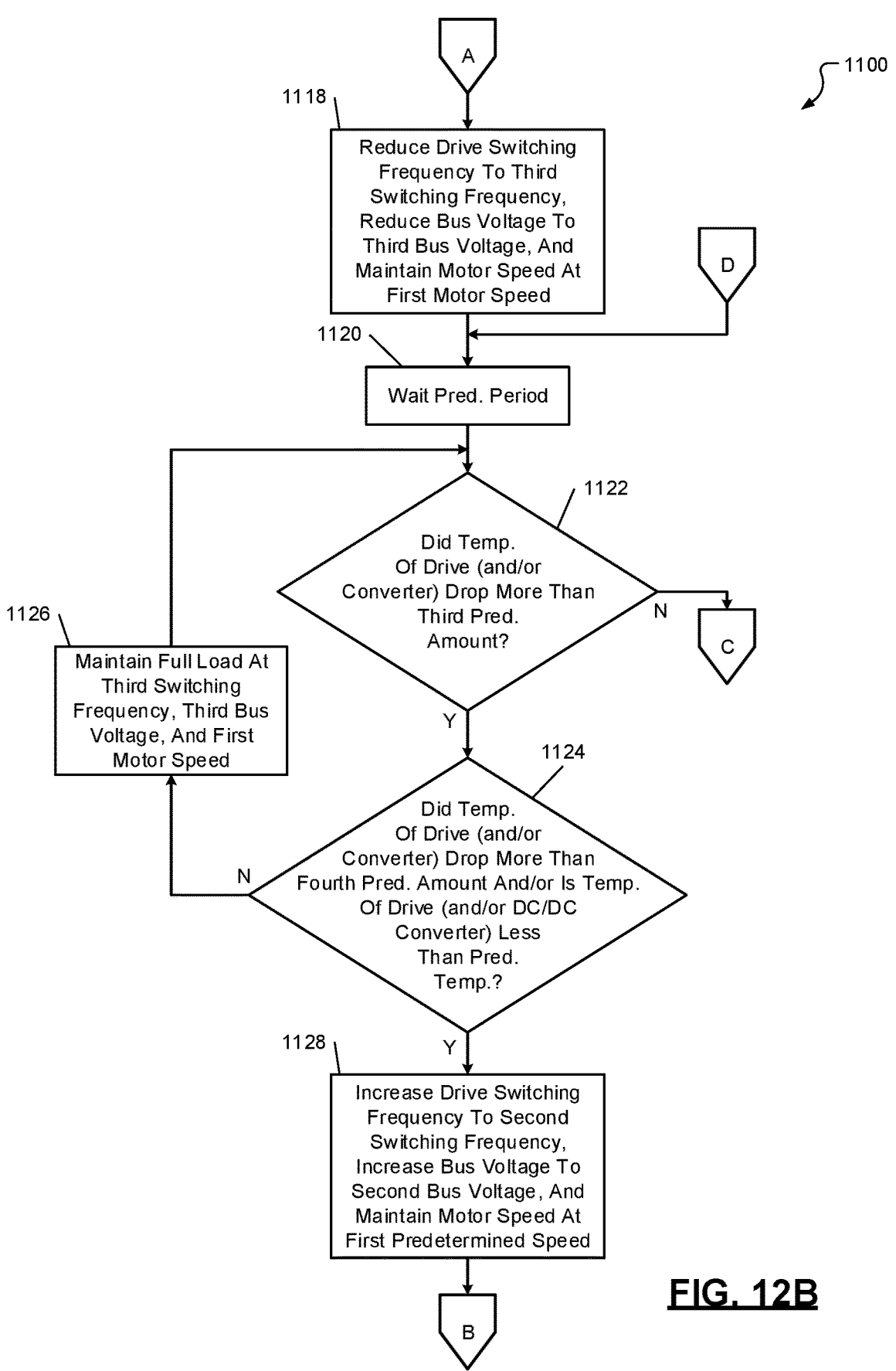
Figure 12C:
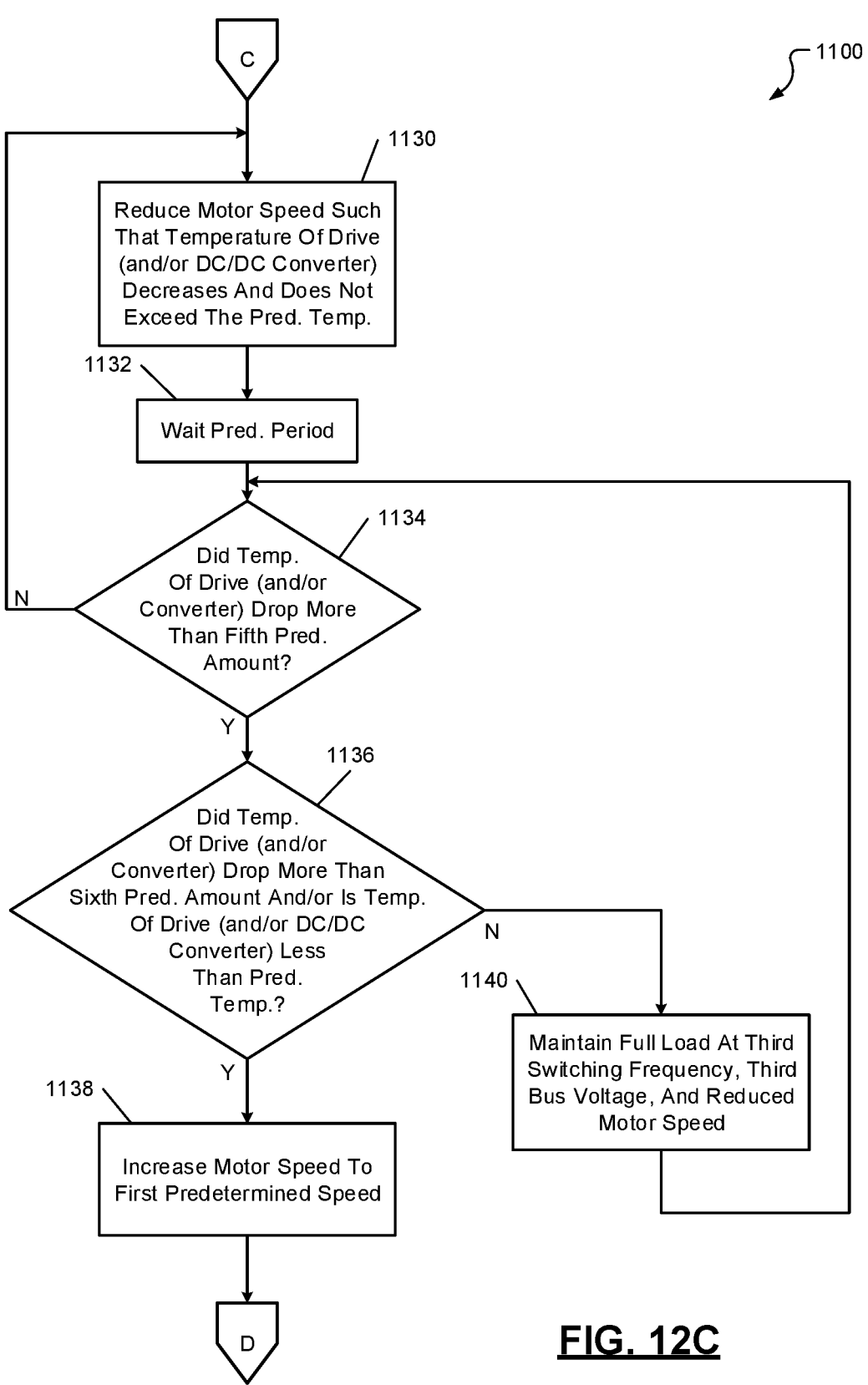
Figure 13:
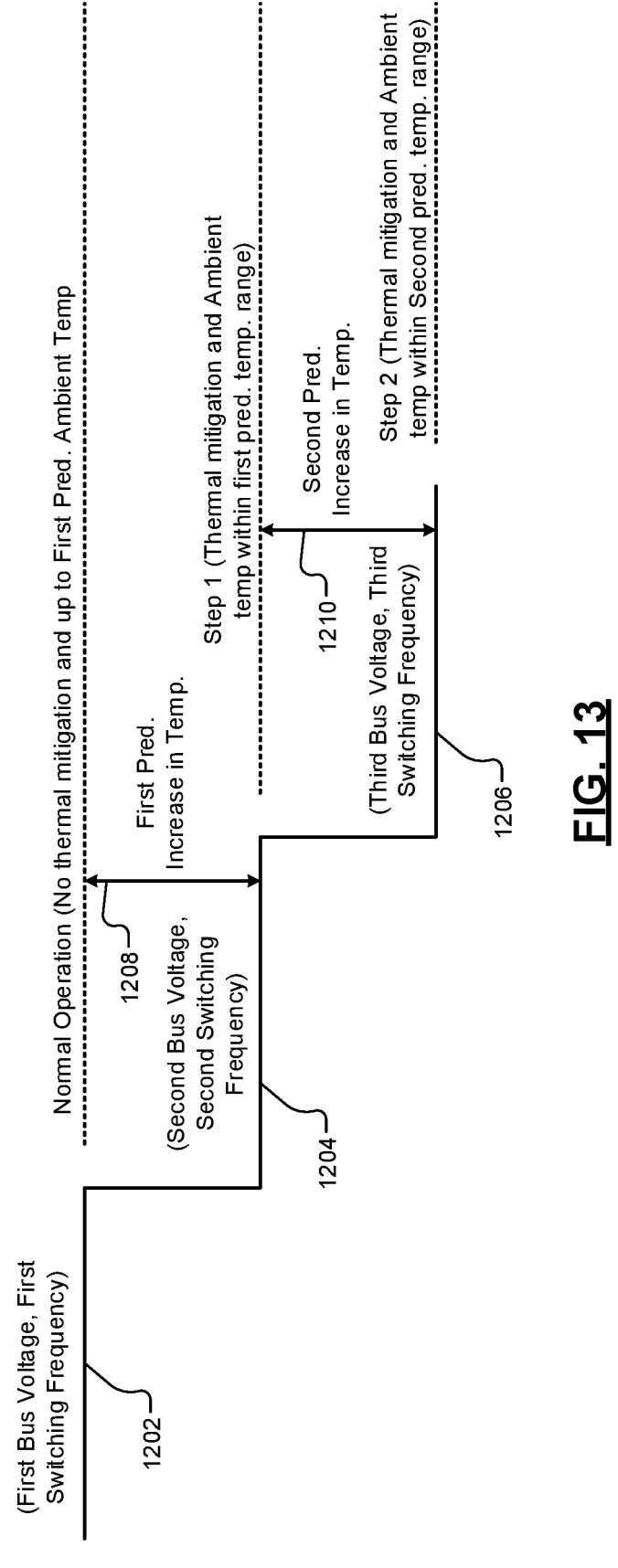
FIG. 13 is a step diagram illustrating a thermal mitigation strategy including different switching frequency and bus voltage operating states of the control and thermal mitigation modules of FIGS. 1A, 1B, 3, 5 and 8.

FIG. 12A-C shows a thermal control method 1100. Although the methods of FIGS. 7 and 12A-12C are shown as separate methods, the methods may be combined and performed as a single method and/or the method of FIGS. 12A-12C may be performed subsequent to performing at least some of the operations of the method of FIG. 7. As an example, once the drive determines that a parameter has exceeded a predetermined threshold and/or is increasing at a rate greater than a predetermined rate, the operations of FIG. 12A-12C may be performed.

Although the following operations are primarily described with respect to the implementations of FIGS. 1A-12C, the operations may be easily modified to apply to other implementations of the present disclosure. The operations may be iteratively performed. Although the following operations are described as being performed by the control module 260, at least some of the operations may be performed by the modules 261, 1000, 1002, 1004 of FIGS. 1A, 1B, 3, 8 and 10.

The method 1100 may begin at 1102. At 1104, the control module 260 may run the drive 256 at a first switching frequency (e.g., 70 kilo-Hertz (kHz)), set the bus voltage of the DC bus between the circuits 812, 832 of FIGS. 8-9 to a first bus voltage (e.g., 380V) and run a motor (e.g., the compressor motor 216) at a first speed (e.g., 7000 revolutions-per-minute (rpm)). The switching frequency refers to the rate at which one or more switches (e.g., the switch(es) 920) of the PFC circuit 900 of FIG. 9 are switched between ON and OFF states.

At 1106, the control module 260 may determine whether the temperature of the drive and/or the temperature of the converter is greater than or equal to a first predetermined temperature (e.g., 90° C.). If yes, operation 1108 is performed, otherwise operation 1104 is performed.

At 1108, the control module 260 reduces the drive switching frequency to a second drive switching frequency (e.g., 60 kHz), reduces the bus voltage of the DC bus to a second bus voltage (e.g., 350V), and maintains the speed of the motor at the first speed. The second drive switching frequency and the second bus voltage are less than the first switching frequency and the first bus voltage.

At 1110, the control module 260 waits a predetermined period (e.g., 15 minutes) prior to proceeding to operation 1112.

At 1112, the control module 260 determines whether the temperature of the drive and/or the converter has dropped more than a first predetermined amount (e.g., 2-5° C.). If yes, operation 1114 is performed, otherwise operation 1118 is performed.

At 1114, the control module 260 determines whether the temperature of the drive and/or the converter has dropped more than a second predetermined amount (e.g., 3-10° C.). If yes, operation 1104 is performed, otherwise operation 1116 is performed. When operation 1104 is performed subsequent to performing operation 1114, the load condition causing the increase in temperature(s) may have been removed.

At 1116, the control module 260 maintains a full load at the second switching frequency, the second bus voltage and the first motor speed.

At 1118, the control module 260 reduces the drive switching frequency to a third drive switching frequency (e.g., 50 kHz), reduces the bus voltage of the DC bus to a third bus voltage (e.g., 325V), and maintains the speed of the motor at the first speed. The third drive switching frequency and the third bus voltage are less than the second switching frequency and the second bus voltage.

At 1120, the control module 260 waits a predetermined period (e.g., 15 minutes) prior to proceeding to operation 1122.

At 1122, the control module 260 determines whether the temperature of the drive and/or the converter has dropped more than a third predetermined amount (e.g., 2-5° C.). The third predetermined amount may be equal to or different than the first predetermined amount. If yes, operation 1124 is performed, otherwise operation 1130 is performed.

At 1124, the control module 260 determines whether the temperature of the drive and/or the converter has dropped more than a fourth predetermined amount (e.g., 3-10° C.). The fourth predetermined amount may be equal to or different than the second predetermined amount. If yes, operation 1128 is performed, otherwise operation 1126 is performed.

At 1126, the control module 260 maintains a full load at the third switching frequency, the third bus voltage and the third motor speed.

At 1128, the control module 260 increases the drive switching frequency to the second switching frequency, increases the bus voltage to the second bus voltage and maintains the speed of the motor at the first speed. Operation 1110 may be performed subsequent to performing operation 1128. When operation 1110 is performed subsequent to performing operation 1128, the load condition causing the increase in temperature(s) may have been removed.

At 1130, the control module 260 reduces the speed of the motor to a speed that is less than the latest motor speed. As an example, the control module 260 may reduce the speed of the motor to a speed that is less than the first speed. In one embodiment, the control module 260 reduces the speed of the motor by 50-500 kHz. This is done to prevent the temperature of the drive and/or the converter from exceeding a predetermined temperature (e.g., 90° C.).

At 1132, the control module 260 waits a predetermined period (e.g., 15 minutes) prior to proceeding to operation 1134.

At 1134, the control module 260 determines whether the temperature of the drive and/or the converter has dropped more than a fifth predetermined amount (e.g., 2-5° C.). The fifth predetermined amount may be equal to or different than the first and third predetermined amounts. If yes, operation 1136 is performed, otherwise operation 1130 is performed.

At 1136, the control module 260 determines whether the temperature of the drive and/or the converter has dropped more than a sixth predetermined amount (e.g., 3-10° C.). The sixth predetermined amount may be equal to or different than the second and fourth predetermined amounts. If yes, operation 1138 is performed, otherwise operation 1140 is performed.

At 1138, the control module 260 increases the drive switching frequency to the second switching frequency, increases the bus voltage to the second bus voltage and maintains the speed of the motor at the first speed. Operation 1120 may be performed subsequent to performing operation 1128. When operation 1120 is performed subsequent to performing operation 1138, the load condition causing the increase in temperature(s) may have been removed.

At 1140, the control module 260 may increase the speed of the motor to a speed greater than a current motor speed. As an example, the speed of the motor may be increased to the first motor speed or a speed greater than the first motor speed, but less than the current motor speed. Operation 1120 may be performed subsequent to operation 1140.

Although the above-described method refers to the decreasing and increasing of converter switching frequencies, inverter switching frequencies may also, or alternatively, be decreased and increased. The inverter switching frequencies may be decreased and/or increased based on similar and/or the same operating conditions as the converter switching frequencies.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

FIG. 13 shows a step diagram 1200 illustrating a thermal mitigation strategy including different switching frequency and bus voltage operating states of operation of the control and thermal mitigation modules 260, 261 of FIGS. 1A, 1B, 3, 5 and 8. A first switching frequency (e.g., 70 kHz) and bus voltage operating state 1202 is shown where the modules 260, 261 are performing a normal operation. This may include performing no thermal mitigation. This operation may be performed for ambient temperatures within a first temperature range, such as for temperatures up to, for example, a first predetermined ambient temperature (e.g., 60° C.). The switching frequency refers to the rate at which one or more switches (e.g., the switches 920) of the PFC circuit 900 of FIG. 9 are switched between ON and OFF states. During the normal operation the DC bus voltage may be at a first predetermined voltage (e.g., 380V). In one embodiment, the drive and PFC circuit 900 operates in the normal operating state for DC/DC converter temperatures up to a predetermined converter temperature (e.g., 90° C.).

The modules 260, 261 may switch to operating in a second switching frequency and bus voltage operating state 1204, which includes operating at a reduced second switching frequency (e.g., 60 kHz) and at a reduced second DC bus voltage of 350V. This may occur for ambient temperatures within a second temperature range (e.g., 60-65° C.). In one embodiment, the drive and PFC circuit 900 transition to the second switching frequency and DC bus voltage operating state 1204 when the temperature of the DC/DC converter exceeds the predetermined converter temperature (e.g., 90° C.). In one embodiment, the modules 260, 261 switch to the second switching frequency and bus voltage operating state 1204 when there is a first increase in ambient temperature (e.g., 1-5° C.), represented by arrow 1208.

The modules 260, 261 may switch to operating in a second switching frequency and bus voltage operating state 1206, which includes operating at a reduced third switching frequency (e.g., 50 kHz) and at a reduced third DC bus voltage of 325V. This may occur for ambient temperatures within a second temperature range (e.g., 65-70° C.). In one embodiment, the modules 260, 261 switch to the third operating state when there is a second increase in ambient temperature (e.g., 4-5° C.), represented by arrow 1210. The modules 260, 261 may transition to the third switching frequency and bus voltage operating state 1206 after operating in the second switching frequency and bus voltage operating state 1204 for at least a first predetermined period of time (e.g., 15 minutes). This may also occur when the temperature of the DC/DC converter is greater than the predetermined converter temperature. When the temperature of the DC/DC converter does not drop below the predetermined converter temperature after operating in the third switching frequency and bus voltage operating state 1206 for a second predetermined period of time, then the modules 260, 261 may reduce the speed command (referred to as derating) to reduce the speed of the motor (e.g., compressor motor). In one embodiment, when reduction in switching frequency and DC bus voltage does not reduce the DC/DC converter temperature, then motor speed is reduced and hence derating is initiated. The modules 260, 261 may then wait the first predetermined period of time before determining whether to cease derating and/or increase the switching frequency and/or DC bus voltage.

Although a certain number of switching frequency and DC bus voltage states are shown, more may be included. In one embodiment, a linear or other switching frequency and DC bus voltage map is used in addition to or as an alternative to that shown in FIG. 13. The linear map may provide one or more linear relationships between (i) the ambient temperature and/or the DC/DC converter temperature, and (ii) the switching frequency, DC bus voltage and/or motor speed.

The thermal mitigation strategy allows the drive to operate at maximum load at significantly higher ambient by shifting the losses to the inverter and out of the front end power converter. The thermal mitigation strategy can extend operating range of drive by, for example, 20-25° C.

Drive component size and costs may be determined based on worst load and known ambient operating temperatures. Worst case ambient operating temperatures and power demands can occur at the same time in typical refrigeration applications. The drives disclosed herein include temperature sensors, power circuits, and current sensors with the ability to control DC bus voltages, boost converter switching frequencies, inverter switching frequencies, motor current levels, motor voltages and maximum input current levels of the motors. The control module balances and shifts losses from the boost converters to the inverters and the motors. When the boost converters are getting too hot (i.e. having temperatures greater than or equal predetermined temperatures), losses are shifted to the inverters and motors.

The examples disclosed herein including adjusting drive bus voltages as a function of motor speed and load. With a low voltage input, there is a large range over which to set a drive bus voltage. Inverter and boost switching frequencies are set for current motor speeds and loads. As the temperature of the drive increases during operation, temperature sensors provide feedback on drive temperatures as well as other temperatures and the drive reacts to the changed temperature operating conditions. When temperature of the boost converter is increasing, the drive may reduce the DC bus voltage, increase an amount of negative d-axis (demagnetized) current (Id), and/or reduce a boost converter switching frequency. The amount of negative d-axis current may be determined based on state of the inverter. This action may be repeated until the associated temperature issue is resolved. The amount of d-axis current may be increased along with reducing the DC bus voltage and/or drive switching frequencies to reduce mechanical power of the motor, which is equal to a product of the torque output and speed of the motor. The amount of negative d-axis current may be increased when the DC bus voltage is reduced and/or when the switching frequencies are reduced during the method of FIG. 12. Similarly, the amount of negative d-axis current may be decreased when the DC bus voltage is increased and/or when the switching frequencies are increased during the method of FIG. 12. In an embodiment, the commanded motor speed is not reduced unless the reduction in the switching frequency and the bus voltage do not resolve the temperature issue. The inverter switching frequency may also be reduced as bus voltage is reduced to reduce secondary heating from the inverter. This can further aid in decreasing the temperature of the converter more than just the reduction in the converter switching frequency and reduction in the bus voltage.

Referring again to FIG. 8, the control module 260 monitors the output current out of the inverter power circuit 832 and provides overcurrent protection and may also regulate current output. The current output may be regulated to a predetermined and/or maximum current level. The current level may be adjusted by controlling states of one or more of the switches in the power factor correction circuit 812 via the power switch(es) control signal. In one embodiment, the amount of torque output is adjusted to indirectly adjust the current level. Torque may be increased to increase the current level. The current level may be reduced indirectly by reducing speed of the compressor motor.

In another embodiment, when the temperature of the inverter is increasing and exceeds a predetermined threshold, the bus voltage may be decreased and the amount of negative d-axis current supplied may be decreased. This may be accomplished via the power switch(es) control signal to alter states of the one or more switches of the PFC circuit 812. The result is that the inverter is transitioned to an overmodulation state, thereby reducing switching losses and inverter heating. If the inverter starts to run out of voltage during overmodulation, the boost converter is commanded to increase the bus voltage to maintain running the inverter at a certain load point. Overmodulation results in reduced switching losses. Overmodulation and clamping are described below.

When the bus voltage is reduced, the switching frequency of the boost converter may be reduced to reduce secondary heating of the boost converter. In one embodiment and during an over temperature condition, the bus voltage is minimized, which forces the inverter to run in overmodulation with a minimum amount of negative d-axis current. The switching frequency of the boost converter may be reduced while the switching frequency of the inverter is low due to overmodulation.

Overmodulation

Figure 14:
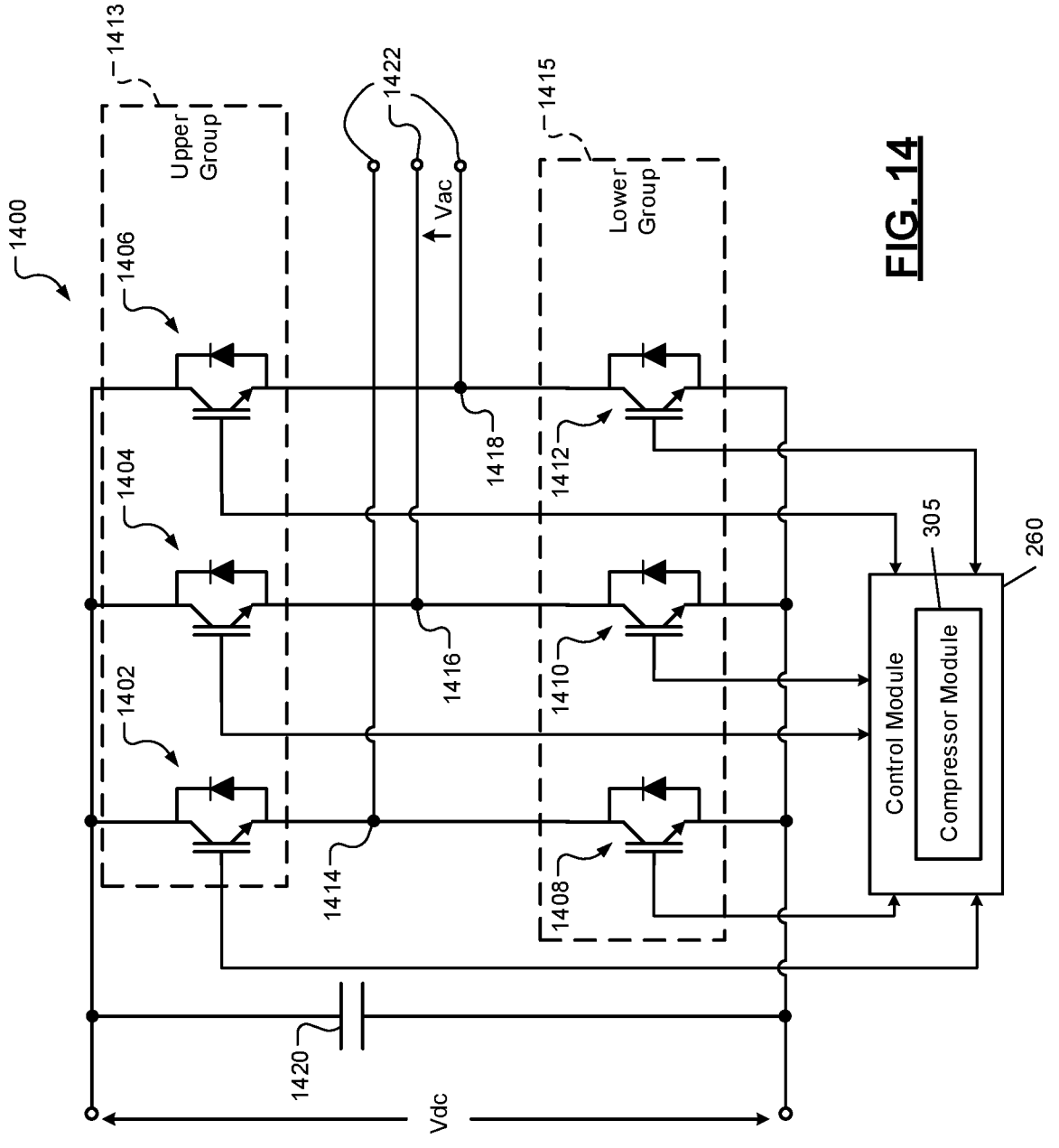
FIG. 14 is a schematic diagram of an inverter.

FIG. 14 shows an example inverter circuit 1400 (also referred to as a "voltage source inverter" and simply "inverter"), which may be implemented in the inverter power circuit 832 of FIG. 8. The inverter power circuit includes six transistor diode pairs 1402, 1404, 1406, 1408, 1410, 1412. The transistor diode pairs 1402, 1404, 1406 are part of an upper group 1413 and the transistor diode pairs 1408, 1410, 1412 are part of a lower group 1415. The pairs 1402, 1404 are connected in series. The pairs 1406, 1408 are connected in series. The pairs 1410, 1412 are connected in series. The series pairs 1402, 1408 are connected in parallel with the series pairs 1404, 1410 and the series pairs 1406, 1412. The DC bus voltage Vdc supplied by the power factor correction circuit 812 of FIG. 8 may be supplied to the input of the inverter power circuit 832. The output voltages provided at terminals 1414, 1416, 1418 between the series pairs 1402, 1408, the series pairs 1404, 1410 and the series pairs 1406, 1412 are provided to the compressor motor 216 of FIG. 8. The control module 260 and/or compressor module 305 control states of the transistors. This control is based on temperature of the inverter and current levels of current supplied to the compressor motor 216.

The inverter 1400 includes six transistors operating as switches. Each transistor is in one of two states. Either it is in an active state or in an inactive state. While in the active state, electrical current is passing through the transistor. While in the inactive state, electrical current is not passing through the transistor. The active state is referred to as an "ON" state and the inactive state is referred to as an "OFF" state.

When the inverter 1400 is active and operating under normal operating conditions, each of the six transistors is being switched from the ON state to the OFF state and back from the OFF state to the ON state with high frequency. For example, the switches may be iteratively transitioned between the ON and OFF states at 10,000 times per second, or 10 kilo Hertz (10 kHz), where Hertz is a unit of frequency and is defined as one cycle per second.

The inverter 1400 receives the DC bus voltage Vdc across a capacitor 1420 and outputs an AC voltage Vac between two of the three output terminals 1422. The ratio of Vac to Vdc depends on a switching sequence pattern of the six transistors. The switching sequence pattern defines the "modulation" of the inverter 1400. As an example, a modulation index may be defined as a ratio of a fundamental component amplitude of a line-to-neutral inverter output voltage to one-half of an available DC bus voltage Vdc. Other definitions of the modulation index may alternatively be applicable.

Figure 15:
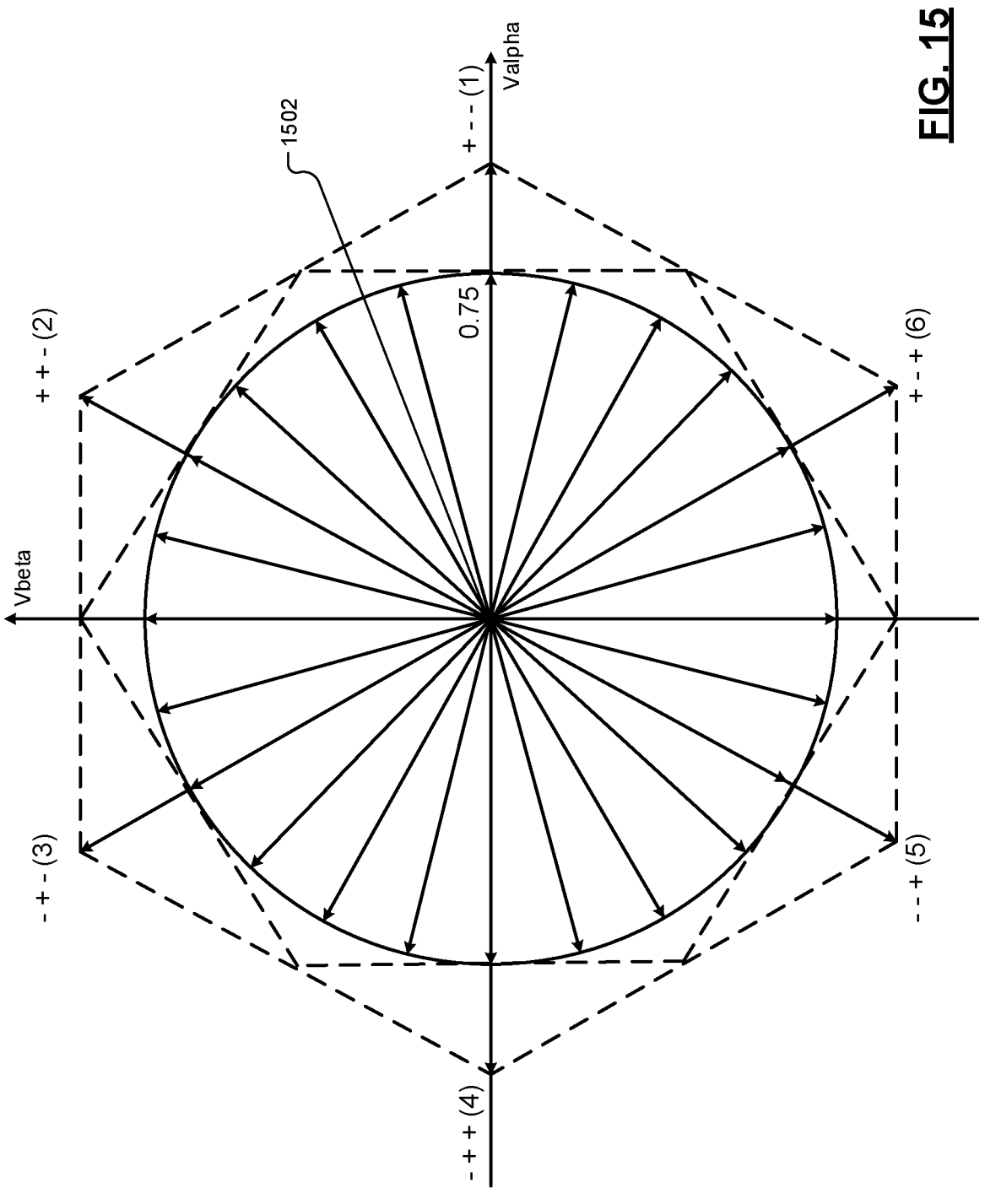
FIG. 15 is a plot of space vectors representing three output AC voltages.

There are three electrical wires connected to the compressor motor 216, which are connected respectively to the shown output terminals 1422. A three phase configuration with three wires (phases) referred to as U, V and W is provided. Voltages between pairs of the three wires are: Vuv—voltage between wire U and V, Vvw—voltage between wire V and W, and Vwu—voltage between wire W and U. A space vector of the three phase system represents all three voltages (Vuv, Vvw, Vwu) between the pairs of the wires. The vector is described by two two space vector components Valpha and Vbeta. A graphical representation of the space vector may be represented by a vector arrow. FIG. 15 shows different space vectors representing the three output AC voltages and different corresponding modulation patterns.

When the rotor of the compressor motor 216 rotates, the space vector is also rotating in time. At any given time, there is only one space vector. The space vector is rotating in a two-dimensional plane about a center 1502 at a certain angular speed and may be at any of the vector positions shown or at other vector positions about the center 1502. The angular speed is related to the speed of the compressor motor 216. If the compressor motor 216 is a permanent magnet synchronous type motor, speed of the space vector is proportional to the speed of the compressor motor 216.

Figure 16:
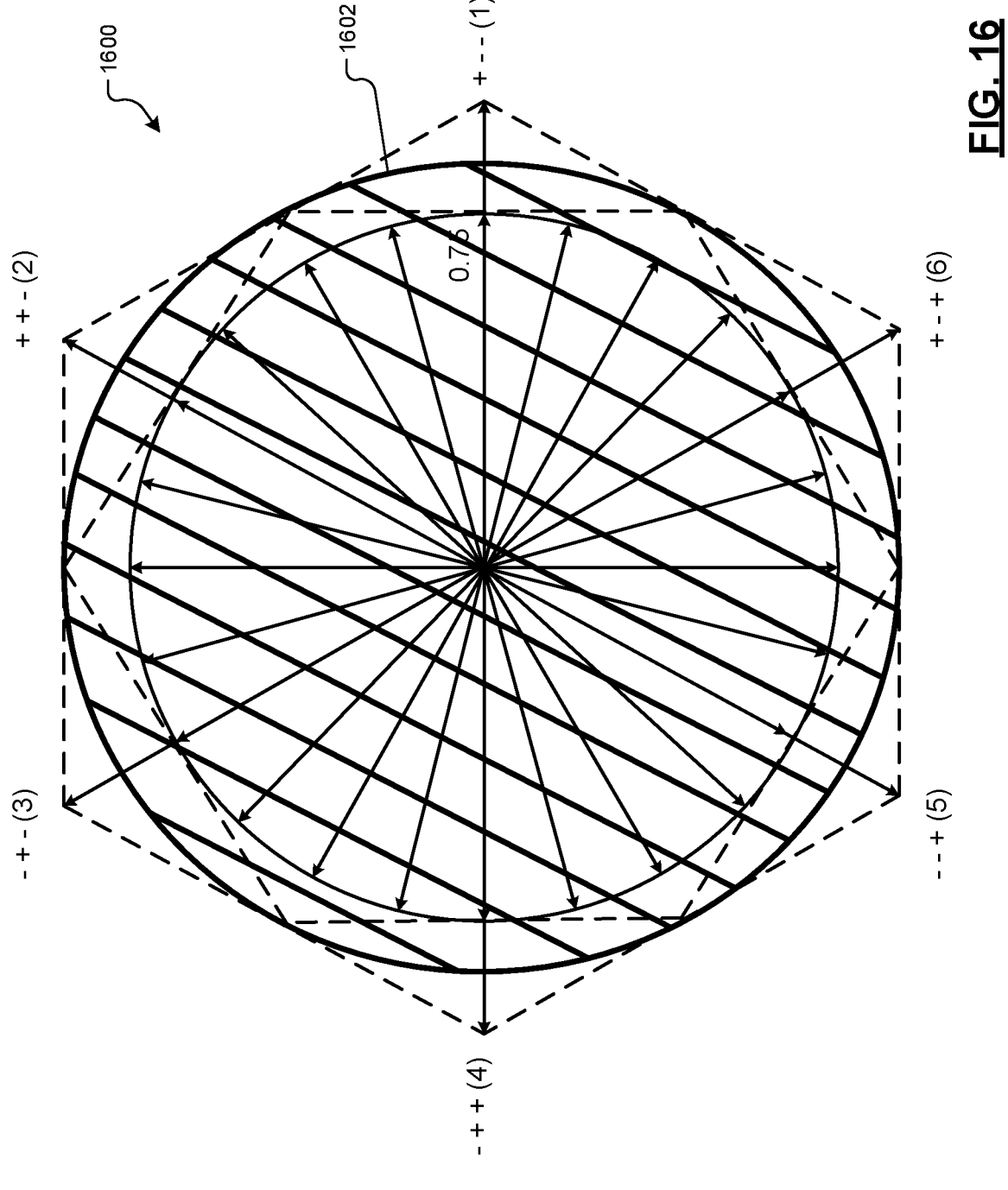
FIG. 16 is a sinusoidal modulation area plot.

FIG. 16 shows an example of a typical sinusoidal modulation area plot 1600 including a linear modulation area (or range) 1602. The plot is referred to as sinusoidal because Valpha and Vbeta in time are represented by a sinusoidal shape.

Figure 17:
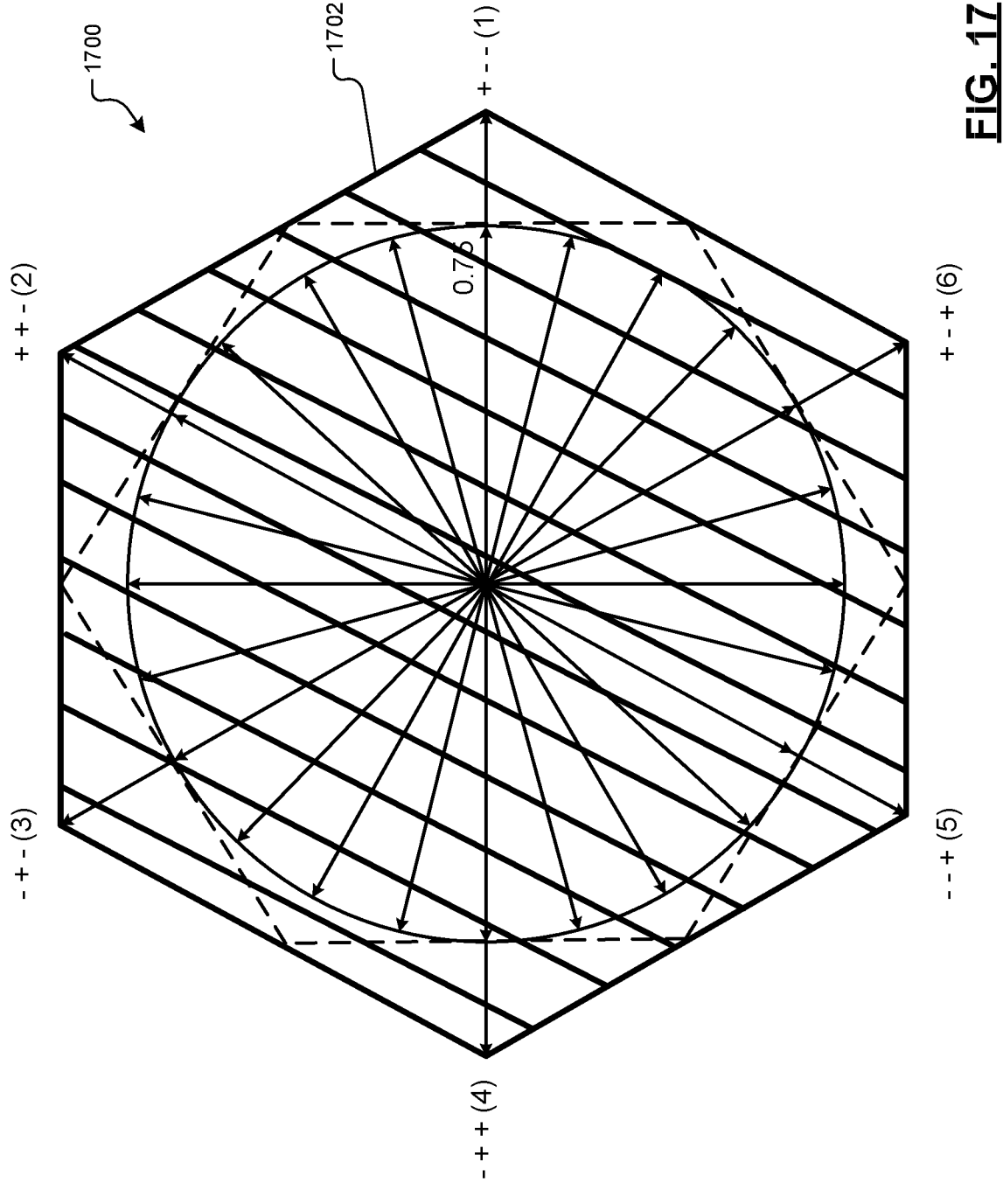
FIG. 17 is an overmodulation area plot.

FIG. 17 shows an overmodulation area plot 1700 and an overmodulation area 1702. At its maximum overmodulation state, the space vector angle is increased with the rate proportional to the angular speed of the compressor motor 216 without sudden changes or jumps and the tip of the space vector is always touching an outer perimeter of the overmodulation area 1702, represented as a hexagon in FIG. 17. The tip of the space vector moves along the outer perimeter.

This type of overmodulation allows for the maximum output voltage of the inverter 1400 to be increased and go beyond a normal operating range for a same input DC bus voltage received. The maximum output voltage is a function of the input voltage. By changing the switching pattern of the transistors of the inverter 1400 overmodulation may be provided. Since the voltage is increased, current in inverter 1400 and the compressor motor 216 is reduced. Reduced current can reduce temperature of the inverter 1400.

Figure 18:
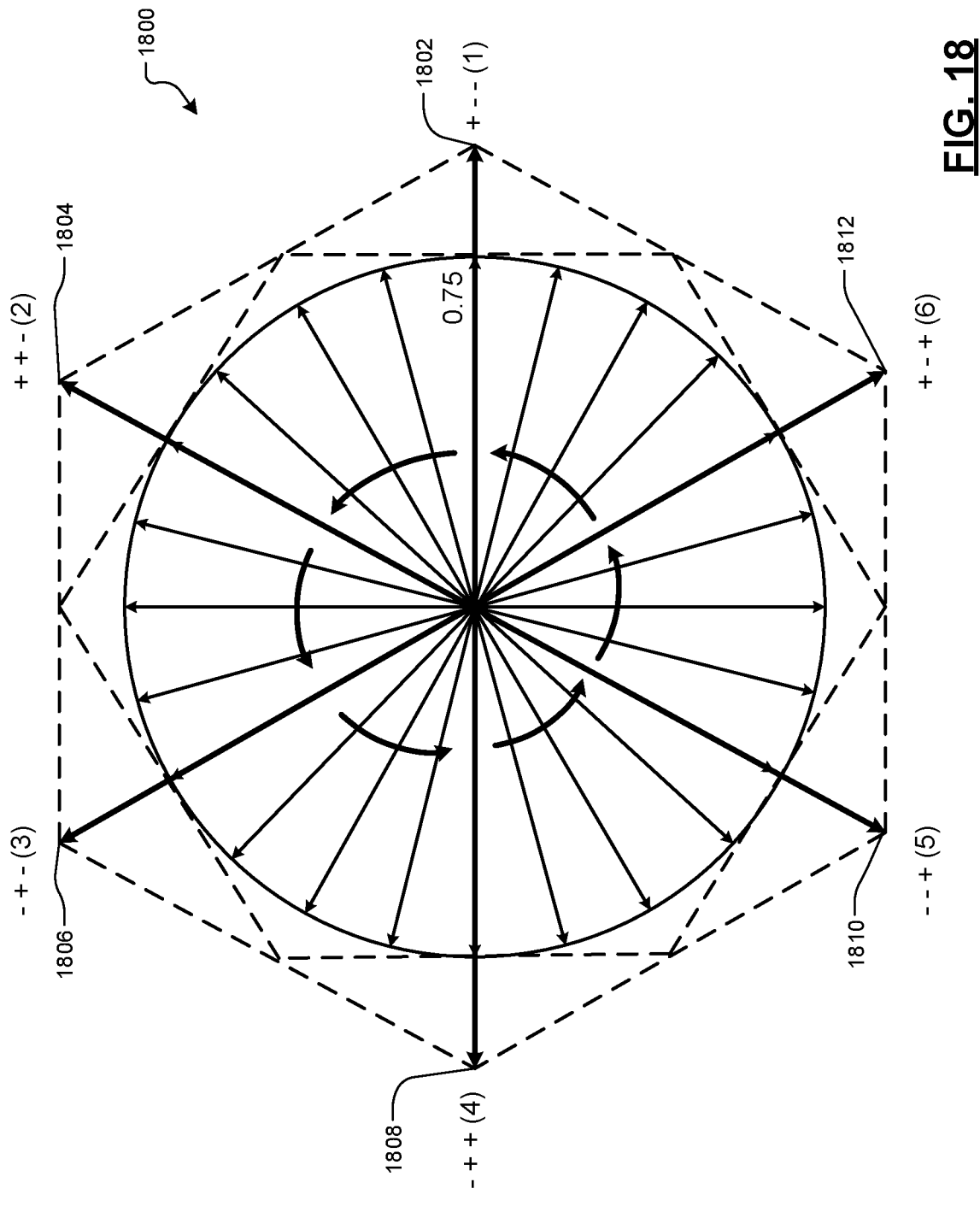
FIG. 18 is a six step overmodulation plot.

FIG. 18 shows a six-step overmodulation plot 1800. In this case, the tip of the space vector is jumping from one position to next (6 points 1802, 1804, 1806, 1806, 1808, 1810) and results in sudden changes of generated torque in the compressor motor 216. This type of overmodulation is not implemented because of negative effects on the compressor motor 216.

Clamping

Two types of clamping for three phase inverters are referred to as "symmetric clamping" and "non-symmetric clamping". Non-symmetric clamping occurs when transistors in either the upper group 1413 or the lower group 1415 of FIG. 14 are not switched (held in an ON state) for a period of time while the other one of the groups 1413, 1415 is switched (transitioned between ON and OFF states). Symmetric clamping occurs when both the upper and lower groups 1413, 1415 are clamped and average clamping time is the same for both of the groups 1413, 1415. "Clamping" reduces a number of inverter transistors switching events to reduce switching losses. Reducing the number of switching events means that some transistors remain in either ON or in OFF state while others are continuing switching actions. This increases efficiency of the inverter 1400.

Clamping may be provided by changing the pulse width modulation (PWM) pattern to the transistors of the inverter 1400 such that there is less switching events per cycle of the compressor motor 216. The transistors may be switched at a lower frequency and some switching events may be skipped, leaving selected switches in, for example, an ON state or an OFF state rather than switching. This reduces operating temperature of the inverter 1400.

As an example, the transistors of the inverter 1400 may be 60° bus clamped for every 180° of motor rotation. Each transistor is not switched for 60° of every 180° of motor rotation (or ⅓ of the time). The non-switching periods of the transistors may be the same or different. During the non-switching period of each of the transistors, that transistor may be clamped to one of the bus rails HIGH or LOW. During the other 120° of the 180° of motor rotation, the transistor(s) are switching, for example switching at 10 kHz. One or more of the transistors of the inverter 1400 may be maintained in an ON state for multiple cycles of the compressor motor 216. Consecutive 100% duty cycles may be implemented. Clamping may be implemented in combination with the above-described overmodulation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A refrigeration system, comprising:
a compressor motor;
an inverter configured to convert a direct current (DC) bus voltage to an alternating current (AC) voltage and supply the AC voltage to the compressor motor;
a converter configured to convert a DC input voltage to the DC bus voltage; and
a control module configured to obtain a parameter and in response to the parameter exceeding a predetermined threshold, reduce the DC bus voltage and increase an amount of negative d-axis current of the compressor motor.

2. The refrigeration system of claim 1, wherein the parameter is a temperature or a current level of current supplied to the compressor motor.

3. The refrigeration system of claim 1, wherein:
the control module is configured to obtain the parameter and one or more other parameters and in response to the parameter and the one or more other parameters, reduce the DC bus voltage and at least one of (i) reduce a switching frequency, (ii) increase the amount of negative d-axis current of the compressor motor, or (iii) reduce a speed of the compressor motor to a speed greater than zero;
the parameter is a temperature; and
the one or more other parameters include a current level of current supplied to the compressor motor.

4. The refrigeration system of claim 1, wherein:
the control module is configured to, based on the parameter, reduce a switching frequency of the converter; and
the control module is configured to, in response to the parameter exceeding the predetermined threshold, reduce the switching frequency of the converter.

5. The refrigeration system of claim 4, wherein the control module is configured to, in response to the parameter exceeding the predetermined threshold and in addition to reducing the switching frequency of the converter, also reduce the switching frequency of the inverter.

6. The refrigeration system of claim 1, wherein:
the control module is configured to, based on the parameter, reduce a switching frequency of the inverter; and
the control module is configured to, in response to the parameter exceeding the predetermined threshold, reduce the switching frequency of the inverter.

7. The refrigeration system of claim 1, wherein the control module is configured to
obtain a temperature of the converter; and
in response to the temperature of the converter being greater than a predetermined temperature, reduce the DC bus voltage and at least one of (i) reduce a switching frequency of the inverter, or (ii) reduce a switching frequency of the converter.

8. The refrigeration system of claim 7, wherein the control module is configured to, subsequent to reducing the DC bus voltage and the at least one of (i) reducing a switching frequency of the inverter, or (ii) reducing a switching frequency of the converter, and in response to the temperature of the converter not increasing and/or not increasing at a predetermined rate, reduce a speed of the compressor motor to a speed greater than zero.

9. The refrigeration system of claim 1, wherein:

the parameter is a temperature of the converter; and the control module is configured to, in response to the temperature of the converter being greater than a predetermined temperature, increase the amount of negative d-axis current of the compressor motor.

10. The refrigeration system of claim 9, wherein the control module is configured to decrease a speed of the compressor motor to reduce the temperature of the converter, only subsequent to determining that reduction in switching frequency of the converter and reduction in the DC bus voltage is not at least one of (i) reducing the temperature of the converter, or (ii) reducing the temperature of the converter at least at a predetermined rate.

11. The refrigeration system of claim 1, wherein the control module is configured to reduce a speed of the compressor motor to a speed greater than zero in response to the parameter exceeding the predetermined threshold.

12. The refrigeration system of claim 1, wherein the control module is configured to:

obtain a temperature of the converter, a temperature of the inverter, a temperature of the control module, and an ambient temperature; and based on the temperature of the converter, the temperature of the inverter, the temperature of the control module, and the ambient temperature reduce the DC bus voltage and at least one of (i) reduce a switching frequency of the inverter, or (ii) reduce a switching frequency of the converter.

13. The refrigeration system of claim 12, wherein the control module is configured to:

determine which one of the temperature of the converter, the temperature of the inverter, the temperature of the control module, and the ambient temperature is a lowest temperature; and reduce the switching frequency based on the lowest temperature.

14. The refrigeration system of claim 12, wherein the control module is configured to:

determine which one of the temperature of the converter, the temperature of the inverter, the temperature of the control module, and the ambient temperature is a lowest temperature; and reduce a speed of the compressor motor to a speed greater than zero based on the lowest temperature.

15. The refrigeration system of claim 12, wherein the control module is configured to:

determine which one of the temperature of the converter, the temperature of the inverter, the temperature of the control module, and the ambient temperature is a lowest temperature; and reduce the DC bus voltage based on the lowest temperature.

16. The refrigeration system of claim 1, further comprising a sensor configured to detect the parameter.

17. The refrigeration system of claim 1, wherein:

the parameter is a temperature of the converter;

the converter is a DC-to-DC boost converter; and the control module is configured to based on the parameter, reduce a switching frequency of a switch of the converter, obtain the temperature of the converter and an ambient temperature, and in response to (i) the temperature of the converter exceeding the predetermined threshold, and (ii) the ambient temperature being within a first predetermined temperature range, reduce the switching frequency from a first switching frequency to a second switching frequency and reduce the DC bus voltage from a first DC bus voltage to a second DC bus voltage.

18. The refrigeration system of claim 17, wherein the control module is configured to, in response to the temperature of the converter being greater than the predetermined threshold and the ambient temperature being within a second predetermined temperature range that is different than the first predetermined temperature range, further reduce the switching frequency from the second switching frequency to a third switching frequency and further reduce the DC bus voltage from the second DC bus voltage to a third DC bus voltage.

19. The refrigeration system of claim 1, wherein the control module is configured to control the inverter in at least one of an overmodulation state or a clamping state to reduce the parameter.

20. The refrigeration system of claim 1, wherein the control module is configured to control the inverter in an overmodulation state and a clamping state to reduce the parameter.

21. The refrigeration system of claim 1, wherein the control module is configured, in response to the parameter exceeding the predetermined threshold, to reduce the DC bus voltage, reduce a switching frequency, and reduce a speed of the compressor motor to a speed greater than zero.

22. A refrigeration system, comprising:

a compressor motor;

an inverter configured to convert a direct current (DC) bus voltage to an alternating current (AC) voltage and supply the AC voltage to the compressor motor;

a converter configured to convert a DC input voltage to the DC bus voltage; and a control module configured to obtain at least one of a temperature of the control module or an ambient temperature; and based on the at least one of the temperature of the control module or the ambient temperature, reduce the DC bus voltage and at least one of (i) reduce a switching frequency of the inverter, or (ii) reduce a switching frequency of the converter.

23. A method of operating a refrigeration system, comprising:

convert via a converter a direct current (DC) input voltage to a DC bus voltage, wherein the converter is a DC-to-DC boost converter;

converting the DC bus voltage to an alternating current (AC) voltage and supplying the AC voltage to drive a compressor motor;

detecting a temperature of the converter;

obtaining an ambient temperature; and in response to (i) the temperature of the converter exceeding a predetermined threshold, and (ii) the ambient temperature being within a first predetermined temperature range, reducing a switching frequency from a first switching frequency to a second switching frequency and reducing the DC bus voltage from a first DC bus voltage to a second DC bus voltage, wherein the switching frequency is a switching frequency of a switch of the converter.

24. The method of claim 23, further comprising, in response to the temperature of the converter being greater than the predetermined threshold and the ambient temperature being within a second predetermined temperature range that is different than the first predetermined temperature range, further reducing the switching frequency from the second switching frequency to a third switching frequency and further reducing the DC bus voltage from the second DC bus voltage to a third DC bus voltage.

25. The refrigeration system of claim 22, wherein the control module is configured to:

obtain the temperature of the control module and the ambient temperature; and based on the temperature of the control module and the ambient temperature, reduce the DC bus voltage and at least one of (i) reduce a switching frequency of the inverter, or (ii) reduce a switching frequency of the converter.

26. A refrigeration system, comprising:

a compressor motor;

an inverter configured to convert a direct current (DC) bus voltage to an alternating current (AC) voltage and supply the AC voltage to the compressor motor;

a converter configured to convert a DC input voltage to the DC bus voltage; and a control module configured to obtain at least one of a temperature of the inverter, a temperature of the control module, or an ambient temperature; and based on the at least one of the temperature of the inverter, the temperature of the control module, or the ambient temperature, reduce the DC bus voltage and reduce a switching frequency of the converter.

27. The refrigeration system of claim 26, wherein the control module is configured to, based on the at least one of the temperature of the inverter, the temperature of the control module, and the ambient temperature, reduce the DC bus voltage and reduce a switching frequency of the converter.

\* \* \* \* \*